United States Patent
Riddle

(10) Patent No.: US 8,793,361 B1
(45) Date of Patent: Jul. 29, 2014

(54) TRAFFIC SYNCHRONIZATION ACROSS MULTIPLE DEVICES IN WIDE AREA NETWORK TOPOLOGIES

(75) Inventor: Guy Riddle, Los Gatos, CA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 1699 days.

(21) Appl. No.: 11/479,371

(22) Filed: Jun. 30, 2006

(51) Int. Cl.
*G06F 15/173* (2006.01)

(52) U.S. Cl.
USPC .......................................................... 709/224

(58) Field of Classification Search
CPC ... H04L 29/06; H04L 41/0896; H04L 43/026; H04L 41/5022; H04L 47/2441; H04L 65/4092; H04L 47/10
USPC .......................................................... 709/224
See application file for complete search history.

(56) References Cited

U.S. PATENT DOCUMENTS

| | | | |
|---|---|---|---|
| 5,793,976 A * | 8/1998 | Chen et al. ..................... | 709/224 |
| 5,920,698 A * | 7/1999 | Ben-Michael et al. ........ | 709/224 |
| 6,011,776 A | 1/2000 | Berthaud | |
| 6,128,713 A | 10/2000 | Eisler | |
| 6,154,776 A | 11/2000 | Martin | |
| 6,195,362 B1 | 2/2001 | Darcie | |
| 6,314,465 B1 * | 11/2001 | Paul et al. ..................... | 709/226 |
| 6,366,945 B1 | 4/2002 | Fong | |
| 6,412,000 B1 * | 6/2002 | Riddle et al. .................. | 709/224 |
| 6,490,249 B1 | 12/2002 | Aboul-Magd | |
| 6,505,253 B1 * | 1/2003 | Chiu et al. .................... | 709/235 |
| 6,546,415 B1 | 4/2003 | Park | |
| 6,560,230 B1 * | 5/2003 | Li et al. ..................... | 370/395.42 |
| 6,590,885 B1 * | 7/2003 | Jorgensen ..................... | 370/338 |
| 6,591,299 B2 * | 7/2003 | Riddle et al. .................. | 709/224 |
| 6,633,909 B1 * | 10/2003 | Barrett et al. ................. | 709/224 |
| 6,636,509 B1 * | 10/2003 | Hughes ......................... | 370/389 |
| 6,658,010 B1 * | 12/2003 | Enns et al. .................... | 370/401 |
| 6,678,248 B1 * | 1/2004 | Haddock et al. .............. | 370/235 |
| 6,771,661 B1 | 8/2004 | Chawla | |
| 6,879,588 B1 * | 4/2005 | Malalur ......................... | 370/389 |
| 6,952,728 B1 * | 10/2005 | Alles et al. .................... | 709/224 |
| 6,952,735 B1 | 10/2005 | Aune | |
| 6,968,323 B1 | 11/2005 | Bansal | |
| 6,990,086 B1 * | 1/2006 | Holur et al. ................... | 370/329 |

(Continued)

OTHER PUBLICATIONS

Office Action for U.S. Appl. No. 10/611,573, Apr. 3, 2007.

(Continued)

*Primary Examiner* — Rupal Dharia
*Assistant Examiner* — Marcus McKenzie
(74) *Attorney, Agent, or Firm* — Baker Botts L.L.P.

(57) ABSTRACT

An exemplary embodiment provides for a method for use in a network device operative to facilitate classification of data flows in a multipath network topology by intelligently mirroring one or more packets of the data flows to a set of cooperating network devices. The method, in one implementation, can involve tracking asymmetric data flows and synchronizing at least portions of the asymmetric data flows between a plurality of network devices to facilitate classification and other operations in multipath network topologies. In one implementation, the present invention allows a plurality of network devices, each disposed on the boundaries of an autonomous system (such as an ISP network) to communicate enough information about data flows encountered at each of the network devices to enable more accurate data flow classification. Since mirrored traffic may affect available bandwidth for regular network traffic, certain implementations of the invention include optimization directed to reducing the amount of mirrored traffic between network devices.

15 Claims, 13 Drawing Sheets

(56) References Cited

U.S. PATENT DOCUMENTS

| | | | |
|---|---|---|---|
| 7,010,611 B1* | 3/2006 | Wiryaman et al. | 709/232 |
| 7,031,304 B1* | 4/2006 | Arberg et al. | 370/360 |
| 7,032,072 B1* | 4/2006 | Quinn et al. | 711/118 |
| 7,130,268 B2* | 10/2006 | Mascolo | 370/232 |
| 7,133,360 B2* | 11/2006 | Le Gouriellec et al. | 370/229 |
| 7,188,188 B1* | 3/2007 | Madhavapeddi et al. | 709/238 |
| 7,334,001 B2* | 2/2008 | Eichstaedt et al. | 707/104.1 |
| 7,353,360 B1* | 4/2008 | Muller et al. | 711/203 |
| 7,366,101 B1 | 4/2008 | Varier | |
| 7,415,034 B2* | 8/2008 | Muller et al. | 370/463 |
| 7,415,035 B1* | 8/2008 | Muller et al. | 370/463 |
| 7,426,634 B2* | 9/2008 | Jain | 713/151 |
| 7,457,870 B1* | 11/2008 | Lownsbrough et al. | 709/224 |
| 7,496,674 B2* | 2/2009 | Jorgensen | 709/230 |
| 7,508,768 B2* | 3/2009 | Yoon et al. | 370/252 |
| 7,516,214 B2* | 4/2009 | Gandhi | 709/224 |
| 7,539,745 B1* | 5/2009 | Wang et al. | 709/224 |
| 7,543,052 B1* | 6/2009 | Cesa Klein | 709/224 |
| 7,551,623 B1* | 6/2009 | Feroz et al. | 370/395.21 |
| 7,567,567 B2* | 7/2009 | Muller et al. | 370/392 |
| 7,610,330 B1* | 10/2009 | Quinn et al. | 709/201 |
| 7,664,048 B1* | 2/2010 | Yung et al. | 370/253 |
| 7,664,127 B1* | 2/2010 | Hendel et al. | 370/413 |
| 7,698,453 B2* | 4/2010 | Samuels et al. | 709/234 |
| 7,774,456 B1* | 8/2010 | Lownsbrough et al. | 709/224 |
| 7,778,194 B1* | 8/2010 | Yung | 370/252 |
| 7,779,164 B2* | 8/2010 | Hendel et al. | 709/250 |
| 7,814,222 B2* | 10/2010 | Venables | 709/232 |
| 7,843,843 B1* | 11/2010 | Papp et al. | 370/252 |
| 7,843,926 B1* | 11/2010 | Muller et al. | 370/392 |
| 7,865,624 B1* | 1/2011 | Hendel et al. | 709/250 |
| 7,889,734 B1* | 2/2011 | Hendel et al. | 370/392 |
| 7,987,306 B2* | 7/2011 | Muller et al. | 710/240 |
| 8,023,528 B2* | 9/2011 | Hendel et al. | 370/463 |
| 8,060,606 B2* | 11/2011 | Friedman et al. | 709/224 |
| 8,064,462 B2* | 11/2011 | Hussain et al. | 370/352 |
| 8,510,491 B1* | 8/2013 | Hendel et al. | 710/260 |
| 2002/0038385 A1 | 3/2002 | Kalliokulju | |
| 2002/0055998 A1* | 5/2002 | Riddle et al. | 709/224 |
| 2002/0073226 A1 | 6/2002 | Sridhar | |
| 2002/0075844 A1* | 6/2002 | Hagen | 370/351 |
| 2002/0103895 A1* | 8/2002 | Chiang | 709/224 |
| 2002/0120745 A1* | 8/2002 | Oishi et al. | 709/226 |
| 2002/0167960 A1 | 11/2002 | Garcia-Luna-Aceves | |
| 2002/0194081 A1* | 12/2002 | Perkowski | 705/26 |
| 2002/0194326 A1 | 12/2002 | Gold | |
| 2003/0005145 A1* | 1/2003 | Bullard | 709/238 |
| 2003/0043792 A1 | 3/2003 | Carpini | |
| 2003/0128711 A1* | 7/2003 | Olariu et al. | 370/401 |
| 2003/0174649 A1* | 9/2003 | Shankar et al. | 370/235 |
| 2003/0227876 A1* | 12/2003 | Ruutu et al. | 370/252 |
| 2003/0236745 A1* | 12/2003 | Hartsell et al. | 705/40 |
| 2004/0003094 A1* | 1/2004 | See | 709/227 |
| 2004/0064577 A1* | 4/2004 | Dahlin et al. | 709/235 |
| 2004/0199793 A1* | 10/2004 | Wilken et al. | 713/201 |
| 2004/0215976 A1* | 10/2004 | Jain | 713/201 |
| 2005/0044443 A1* | 2/2005 | Magnaghi et al. | 714/4 |
| 2005/0220091 A1* | 10/2005 | LaVigne et al. | 370/389 |
| 2005/0265248 A1* | 12/2005 | Gallatin et al. | 370/250 |
| 2006/0114915 A1* | 6/2006 | Kalkunte et al. | 370/395.53 |
| 2006/0143300 A1* | 6/2006 | See et al. | 709/227 |
| 2006/0221832 A1* | 10/2006 | Muller et al. | 370/235 |
| 2006/0251072 A1* | 11/2006 | Hendel et al. | 370/392 |
| 2006/0251108 A1* | 11/2006 | Hendel et al. | 370/463 |
| 2006/0251109 A1* | 11/2006 | Muller et al. | 370/463 |
| 2006/0268932 A1* | 11/2006 | Singh et al. | 370/468 |
| 2007/0248049 A1* | 10/2007 | Fajardo et al. | 370/331 |
| 2008/0117899 A1* | 5/2008 | Sullivan et al. | 370/389 |
| 2008/0240128 A1* | 10/2008 | Elrod | 370/401 |
| 2010/0118884 A1* | 5/2010 | Hendel et al. | 370/412 |
| 2010/0121953 A1* | 5/2010 | Friedman et al. | 709/224 |
| 2011/0110380 A1* | 5/2011 | Muller et al. | 370/412 |

OTHER PUBLICATIONS

Office Action for U.S. Appl. No. 10/611,573, Oct. 16, 2007.
Office Action for U.S. Appl. No. 10/858,340, Oct. 20, 2008.
Response to Final Office Action dated Feb. 8, 2010 for U.S. Appl. No. 12/046,089, Feb. 26, 2010.
U.S. Appl. No. 12/046,089 entitled "Network Traffic Synchronization Mechanism," filed Mar. 11, 2008.

* cited by examiner

TRAFFIC SYNCHRONIZATION ACROSS MULTIPLE DEVICES IN WIDE AREA NETWORK TOPOLOGIES

CROSS-REFERENCE TO RELATED APPLICATIONS

This application makes reference to the following commonly owned U.S. patent applications, which are herein incorporated in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658; in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, now U.S. Pat. No. 6,456,360, in the name of Robert L. Packer, Brett D. Galloway and Ted Thi, entitled "Method for Data Rate Control for Heterogeneous or Peer Internetworking;"

U.S. patent application Ser. No. 09/710,442, in the name of Todd Krautkremer and Guy Riddle, entitled "Application Service Level Mediation and Method of Using the Same;"

U.S. patent application Ser. No. 09/966,538, in the name of Guy Riddle, entitled "Dynamic Partitioning of Network Resources;"

U.S. patent application Ser. No. 10/015,826 in the name of Guy Riddle, entitled "Dynamic Tunnel Probing in a Communications Network;"

U.S. patent application Ser. No. 10/039,992, in the name of Michael J. Quinn and Mary L. Laier, entitled "Method and Apparatus for Fast Lookup of Related Classification Entities in a Tree-Ordered Classification Hierarchy;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/178,617, in the name of Robert E. Purvy, entitled "Methods, Apparatuses and Systems Facilitating Analysis of Network Device Performance;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 10/236,149, in the name of Brett Galloway and George Powers, entitled "Classification Data Structure enabling Multi-Dimensional Network Traffic Classification and Control Schemes;"

U.S. patent application Ser. No. 10/334,467; in the name of Mark Hill, entitled "Methods, Apparatuses and Systems Facilitating Analysis of the Performance of Network Traffic Classification Configurations;"

U.S. patent application Ser. No. 10/453,345, in the name of Scott Hankins, Michael R. Morford, and Michael J. Quinn, entitled "Flow-Based Packet Capture;"

U.S. patent application Ser. No. 10/611,573, in the name of Roopesh Varier, David Jacobson and Guy Riddle, entitled "Network Traffic Synchronization Mechanism;"

U.S. patent application Ser. No. 10/676,383 in the name of Guy Riddle, entitled "Enhanced Flow Data Records Including Traffic Type Data;"

U.S. patent application Ser. No. 10/720,329, in the name of Weng-Chin Yung, Mark Hill and Anne Cesa Klein, entitled "Heuristic Behavior Pattern Matching of Data Flows in Enhanced Network Traffic Classification;"

U.S. patent application Ser. No. 10/812,198 in the name of Michael Robert Morford and Robert E. Purvy, entitled "Adaptive, Application-Aware Selection of Differentiated Network Services;"

U.S. patent application Ser. No. 10/843,185 in the name of Guy Riddle, Curtis Vance Bradford and Maddie Cheng, entitled "Packet Load Shedding;"

U.S. patent application Ser. No. 10/858,340 in the name of Roopesh R. Varier, James J. Stabile, Paul Leslie Archard, Guy Riddle and David Jacobsen, entitled "Network Traffic Synchronization and Data Compression in Redundant Network Topologies;"

U.S. patent application Ser. No. 10/938,435 in the name of Guy Riddle, entitled "Classification and Management of Network Traffic Based on Attributes Orthogonal to Explicit Packet Attributes;" and U.S. patent application Ser. No. 11/027,744 in the name of Mark Urban, entitled "Adaptive Correlation of Service Level Agreement and Network Application Performance."

BACKGROUND

Enterprises have become increasingly dependent on computer network infrastructures to provide services and accomplish mission-critical tasks. Indeed, the performance, security, and efficiency of these network infrastructures have become critical as enterprises increase their reliance on distributed computing environments and wide area computer networks. To that end, a variety of network devices have been created to provide data gathering, reporting, and/or operational functions, such as firewalls, gateways, packet capture devices, bandwidth management devices, application traffic monitoring devices, and the like. For example, the TCP/IP protocol suite, which is widely implemented throughout the world-wide data communications network environment called the Internet and many wide and local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily.

To facilitate monitoring, management and control of network environments, a variety of network devices, applications, technologies and services have been developed. For example, certain data flow rate control mechanisms have been developed to provide a means to control and optimize efficiency of data transfer as well as allocate available bandwidth among a variety of business enterprise functionalities. For example, U.S. Pat. No. 6,038,216 discloses a method for explicit data rate control in a packet-based network environment without data rate supervision. Data rate control directly moderates the rate of data transmission from a sending host, resulting in just-in-time data transmission to control inbound traffic and buffering of packets, and reduce the inefficiencies associated with dropped packets. Bandwidth management devices also allow for explicit data rate control for flows associated with a particular traffic classification. For example, U.S. Pat. No. 6,412,000, above, discloses automatic classification of network traffic for use in connection with bandwidth allocation mechanisms. U.S. Pat. No. 6,046,980 discloses systems and methods allowing for application layer control of bandwidth utilization in packet-based computer networks. For example, bandwidth management devices allow network administrators to specify policies operative to control and/or prioritize the bandwidth allocated to individual data flows according to traffic classifications. In addition, certain bandwidth management devices, as well as certain routers, allow network administrators to specify aggregate bandwidth utilization controls to divide available bandwidth into partitions. With some network devices, these partitions can be configured to provide a minimum bandwidth guarantee, and/or cap bandwidth, as to a particular class of traffic. An administrator specifies a traffic class (such as FTP data, or data flows involving a specific user or network application) and the size of the reserved virtual link—i.e., minimum guaranteed bandwidth and/or maximum bandwidth. Such partitions can be applied on a per-application basis (protecting and/or capping bandwidth for all traffic associated with an application) or a per-user basis (controlling, prioritizing, protecting and/or capping bandwidth for a particular user). In addition, certain bandwidth management devices allow administrators to define a partition hierarchy by configuring one or more partitions dividing a network path and further dividing the parent partitions into one or more child partitions. U.S. patent application Ser. No. 10/108,085 discloses data structures and methods for implementing a partition hierarchy.

Certain application traffic management devices, such as the PacketShaper® application traffic management device, offered by Packeteer®, Inc. of Cupertino, Calif., support the concurrent use of aggregate bandwidth policies (e.g., partitions), and per-flow bandwidth policies, such as rate policies enforced by the TCP Rate control technologies disclosed in U.S. Pat. No. 6,038,216. A partition is essentially a bandwidth allocation and queuing mechanism. That is, after a packet processor classifies each packet and pushes each packet onto a partition queue associated with the appropriate partition, another process, typically, loops through the partition queues to pop packets off the queues and populate an output queue. Aggregate bandwidth allocation among the different partitions essentially establishes a preference by which a flow control mechanism arbitrates among the corresponding partition queues. For example, a flow control module, while arbitrating among the partition queues, may read more packets from partitions having a higher allocation of bandwidth relative to partitions that have lower allocations. For example, as disclosed in U.S. application Ser. No. 10/108,085, incorporated by reference above, the bandwidth allocated to a given partition affects the rate at which the partition is selected by an output scheduling process and therefore the length of time packets are buffered in the corresponding partition queue. In addition, TCP Rate Control technologies can be used to affect per-flow rate policies to control or influence the rate at which packets are received at a network device and, therefore, use of inbound network bandwidth and the amount of data that is queued at any given time.

The Transmission Control Protocol (TCP) provides connection-oriented services for the protocol suite's application layer—that is, the client and the server must establish a connection to exchange data. TCP transmits data in segments embodied in IP datagrams, along with checksums, used to detect data corruption, and sequence numbers to ensure an ordered byte stream. TCP is considered to be a reliable transport mechanism because it requires the receiving host to acknowledge not only the receipt of data but also its completeness and sequence. If the sending host does not receive notification from the receiving host within an expected time frame, the sending host times out and retransmits the segment.

TCP uses a sliding window flow-control mechanism to control the throughput over wide-area networks. As the receiving host acknowledges initial receipt of data, it advertises how much data it can handle, called its window size. The sending host can transmit multiple packets, up to the advertised window size, before it stops and waits for an acknowledgment. The sending host transmits data packets up to the advertised window size, waits for acknowledgement of the data packets, and transmits additional data packets.

TCP's congestion-avoidance mechanisms attempt to alleviate the problem of abundant packets filling up router queues. TCP's slow-start algorithm attempts to take full advantage of network capacity. TCP increases a connection's transmission rate using the slow-start algorithm until it senses a problem and then it backs off. It interprets dropped packets and/or timeouts as signs of congestion. The goal of TCP is for individual connections to burst on demand to use all available bandwidth, while at the same time reacting conservatively to inferred problems in order to alleviate congestion. Specifically, while TCP flow control is typically handled by the receiving host, the slow-start algorithm uses a congestion window, which is a flow-control mechanism managed by the sending host. With TCP slow-start, when a connection opens, only one packet is sent until an ACK is received. For each received ACK, the sending host doubles the transmission size, within bounds of the window size advertised by the receiving host. Note that this algorithm introduces an exponential growth rate. The TCP transmitter increases a connection's transmission rate using the slow-start algorithm until it senses a problem and then it backs off. It interprets dropped packets and/or timeouts as signs of congestion. Once TCP infers congestion, it decreases bandwidth allocation rates.

Application traffic management devices are often deployed at the edges of enterprise networks to control bandwidth utilization, for example, across an access link to a wide area network (WAN). When the traffic management device is situated at that single gateway between one and other networks, it will logically be able to process all inbound and outbound traffic. As a result, the device can effectively classify, flows and maintain rate control policies on specific partitions.

However, application traffic management devices are often deployed in other scenarios. For example, it is often desirable to deploy multiple devices at multiple gateways of a particular autonomous system such as autonomous system AS1 shown in the network environment 2 of FIG. 1. Autonomous system AS1 could perhaps be an Internet Service Provider (ISP) which may support multiple gateway connections to a plurality of autonomous systems. As mentioned, AS1 may include multiple network devices (e.g., application traffic management devices ND1, ND2 and ND3) each of which is situated in-line with a router (4, 6, 8). AS1 is also connected a network 10, via router 12, and network 10 includes multiple workstations 12a-12d and a server 14.

Given the routing behavior of packet switched networks, acknowledgments and other network traffic pertaining to a particular data flow may not necessarily come through the same PacketShaper® that sent packets that resulted in the return ACK. For example, workstation 12c initiates a data flow that includes one or more packets and those packets are forwarded through ND1 to their ultimate destination, workstation 16 of network 18. The packets travel, for example, through AS1 and AS2 in order to get to workstation 16. In response, workstation 16 sends an ACK that is routed through AS4 and AS3. If the return ACK reaches AS1 through AS3, ND1 will not see it, which can adversely affect proper traffic flow classification and/or traffic management functions. For example, certain network traffic types can not be classified based on a simple analysis of port numbers, and may require examination of traffic flow in both directions to be appropriately classified. The inability to properly classify such network traffic therefore prevents the identification of one or more desired policies that should be applied to the network traffic. This situation can also occur in the reverse direction. For example, workstation 16 may initiate a data flow that includes one or more packets destined for workstation 12c. Those packets may travel through ND2 and a return ACK from workstation 12c could perhaps travel through ND1 on its way to workstation 16. These types of data flows where the return path (or at least the edge device on which return packets are encountered) is different from the forward path (or the edge device from which packets are originally forwarded) are sometimes referred to as asymmetric data flows.

In view of the foregoing, it may be beneficial to provide methods, apparatuses and systems to detect asymmetric data flows and share information on those asymmetric data flows between the various application traffic management or other network devices.

The foregoing examples of the related art and limitations related therewith are intended to be illustrative and not exclusive. Other limitations of the related art will become apparent to those of skill in the art upon a reading of the specification and a study of the drawings.

SUMMARY

An embodiment by way of non-limiting example provides for a method for use in a network device operative to facilitate classification of data flows in a multipath network topology by intelligently mirroring one or more packets of the data flows to a set of cooperating network devices. The method, in one implementation, can involve tracking asymmetric data flows and synchronizing at least portions of the asymmetric data flows between a plurality of network devices to facilitate classification and other operations in multipath network topologies. In one implementation, the present invention allows a plurality of network devices, each disposed on the boundaries of an autonomous system (such as an ISP network) to communicate enough information about data flows encountered at each of the network devices to enable more accurate data flow classification. Since mirrored traffic may affect available bandwidth for regular network traffic, certain implementations of the invention include optimizations directed to reducing the amount of mirrored traffic between network devices. In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

Figure 1:
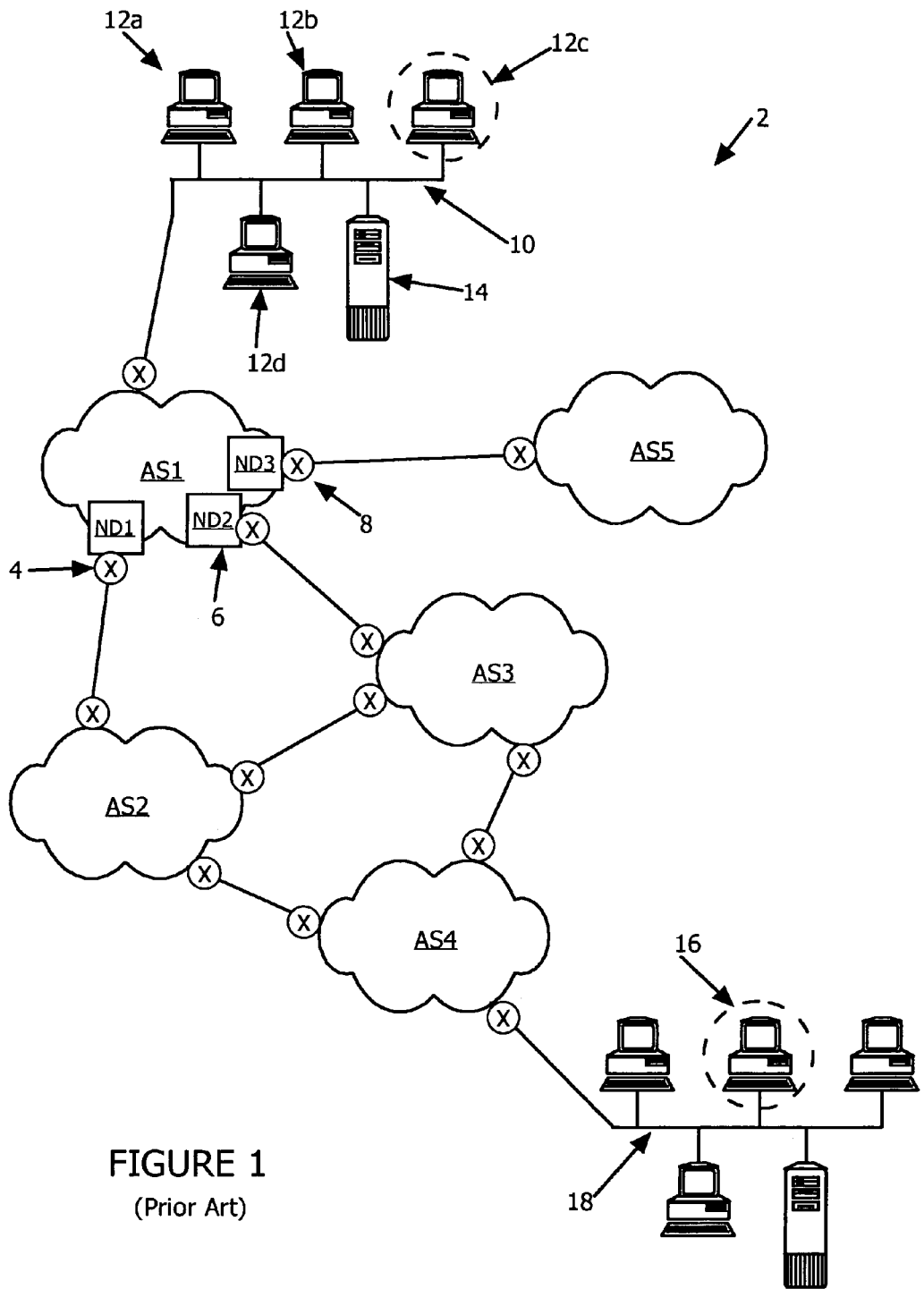
FIG. 1 is a functional block diagram illustrating various interconnected autonomous systems and related networks.

The following embodiments and aspects thereof are described and illustrated in conjunction with systems, apparatuses and methods which are meant to be exemplary and illustrative, not limiting in scope.

The claimed embodiments contemplate systems, apparatuses and methods for intelligently mirroring data flow packets between multiple network devices situated in an autonomous system wherein the network devices are operable to classify data flows and mirror data flow packets to other network devices. When a new data flow is encountered, at a particular network device, the claimed embodiments envision a number of options for communicating information, related to that data flow, to the other network devices. The embodiments described below provide for mirroring packets of received data flows to one or more cooperating network devices. By doing so, a cooperating network device that encounters one part of an asymmetric data flow will be better able to properly classify that one part and further enforce rate control policies, if necessary.

One embodiment of the present invention includes mirroring packets of data flows until the data flow is classified. Since each network device (or at least the classification functionality associated therewith) will typically be similar or identical to each other, each network device will typically be able to reach the same classification of flows based on the same initial number of packets of a data flow. Restated, if a particular network device can classify a data flow within the first "X" number of packets, then only those "X" number of packets need to be mirrored to the other network devices as they will be able to reach the same classification based on those "X" number of packets. This particular embodiment advantageously reduces the overall number of mirrored packets sent between the various network devices.

Yet another embodiment calls for a data flow to be monitored for an indication of asymmetry. Once the indication is received, the data flow, and subsequent data flows to the same external host, are then mirrored to other cooperating network devices. A further modification of this embodiment includes mirroring data flows associated with a new external host for a time period after initial discovery of the external host. In addition, all new flows associated with the newly discovered external host encountered during this time period are also mirrored. If any data flow associated with the new external host becomes asymmetric either during or after the time period, then flows corresponding to the external host are mirrored. Otherwise, if no asymmetry is detected during the initial period of time, mirroring of new data flows involving the external host will be discontinued once the time period expires.

Still another embodiment provides for mirroring a data flow, associated with a newly detected external host, to other cooperating network devices, that the network device has not seen before. When that mirrored traffic is received at the other network devices, a seen elsewhere flag associated with the external host is marked in a host database of each of the network devices that received the mirrored data flow. When another data flow, associated with the external host, is detected at a network device, that network device will then mirror classification traffic associated with the data flow to other network devices. In one implementation, traffic mirroring may involve indicator traffic. Indicator traffic generally refers to a data flow that is associated or related to other data flows. For example, a SIP flow generally corresponds to, and is an indicator of, a future RTP data flow. Associating such indicator traffic to other data flows facilitates classification of other data flows at the one or more other network devices. For example, a network device can retain a characteristic of a packet that it discovered when that packet was traveling between nodes A and C. That characteristic can then perhaps be used to classify other data flow traffic between nodes A and B.

Another embodiment utilizes a mirroring device identifier in association with corresponding external hosts. The mirroring device identifier (e.g., a MAC address), when associated with a given external host, allows a network device to determine to which other network devices it should mirror packets. For example, if a first network device receives mirrored packets, the device will set a mirroring device identifier for the external host identified in the mirrored packets to the address of the second network device that sent the mirrored packets. If the first network device receives non-mirrored classification packets to the same external host as the mirrored packets, the first network device mirrors those new packets to the second network device. If the network device receives more mirrored traffic of the same external host but from a third network device, the first network device changes its mirroring device identifier such that the network device will now mirror future packets of the same external host to all cooperating network devices. In this manner, mirroring of packets can potentially be limited to just two network devices as long as an asymmetric data flow only involves those two network devices.

Figure 2:
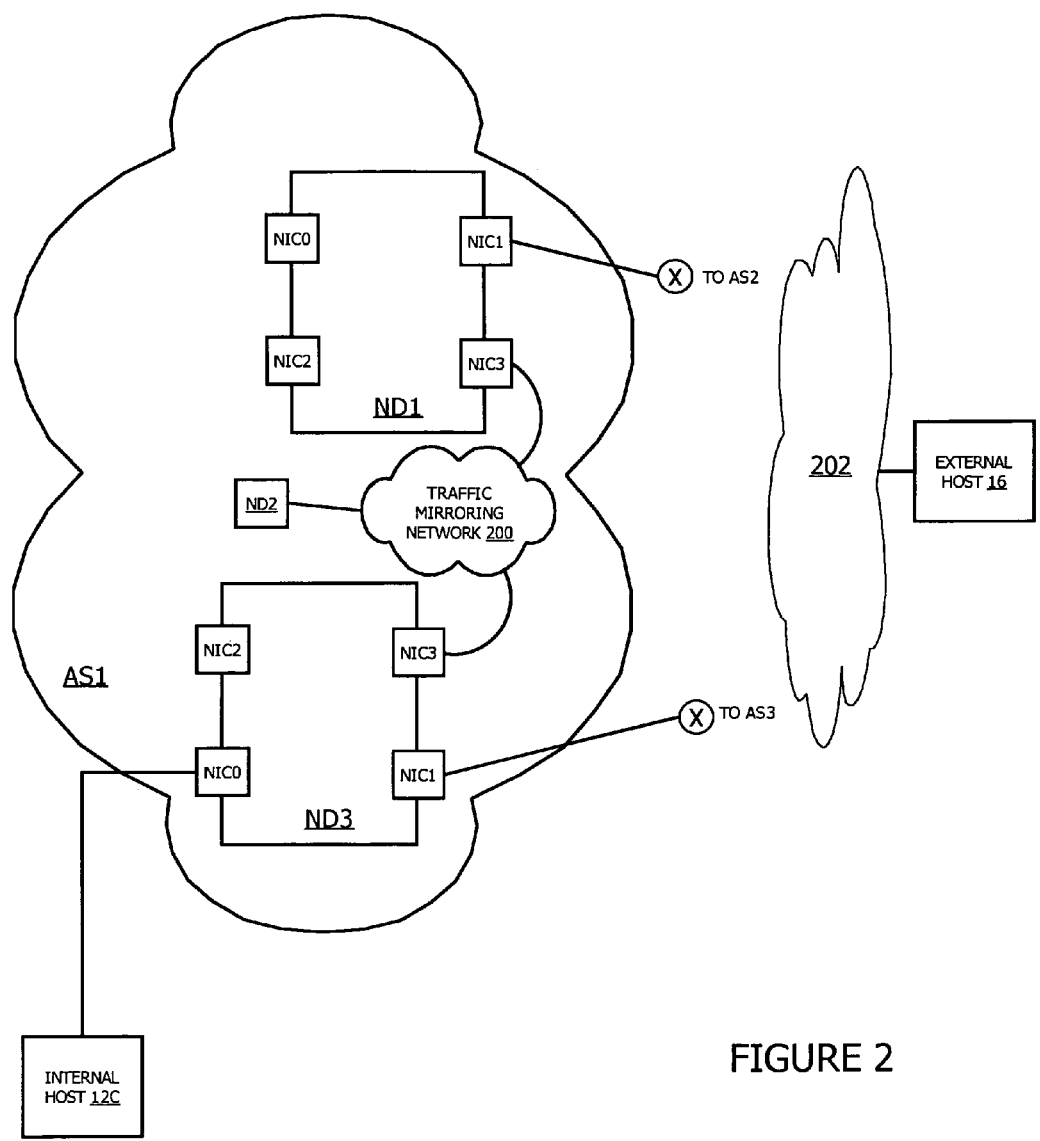
FIG. 2 is a functional block diagram illustrating internetwork device communication within an autonomous system, in accordance with an exemplary embodiment.

In order to mirror packets, the network devices are logically connected to each other. For example, FIG. 2 is a functional block diagram illustrating inter-device communication within an autonomous system, in accordance with an exemplary embodiment. Each network device (ND1, ND2, ND3) includes multiple network interface cards (NIC0, NIC1, NIC2, NIC3). In the configuration of FIG. 2, the NIC0s are connected to AS1 and the NIC1s are connected to other autonomous systems. The NIC2s shown in ND1 and ND2 are optional. The NIC3s of each network device (ND1, ND2, ND3) are all connected to a traffic mirroring network 200. When packets are mirrored, for example from ND2, the packets may be transmitted to network devices ND1 and ND3 across traffic mirroring network 200. Network cloud 202 signifies any intervening autonomous systems that may be between AS1 and external host 16.

In one implementation, NIC3s of network devices ND1, ND2, ND3 are connected to corresponding switch or router ports of one or more network devices of AS1. In one implementation, the ports are assigned a unique Virtual LAN (VLAN) identifier dedicated to mirror traffic. In another implementation, the ports are connected to a dark fiber portion of the network. In addition, routers of AS1 can be configured to use "Ethernet Wire Service," "Ethernet Relay Service" or "Ethernet Multipoint Service" in order to implement traffic mirroring network 200 and related mirroring functions between the network devices. These various protocols are described in the Cisco Systems, Inc.® document entitled "Enterprise Connections to Layer 2 Services."

A. Exemplary Network Device Architecture and Operation

Figure 3:
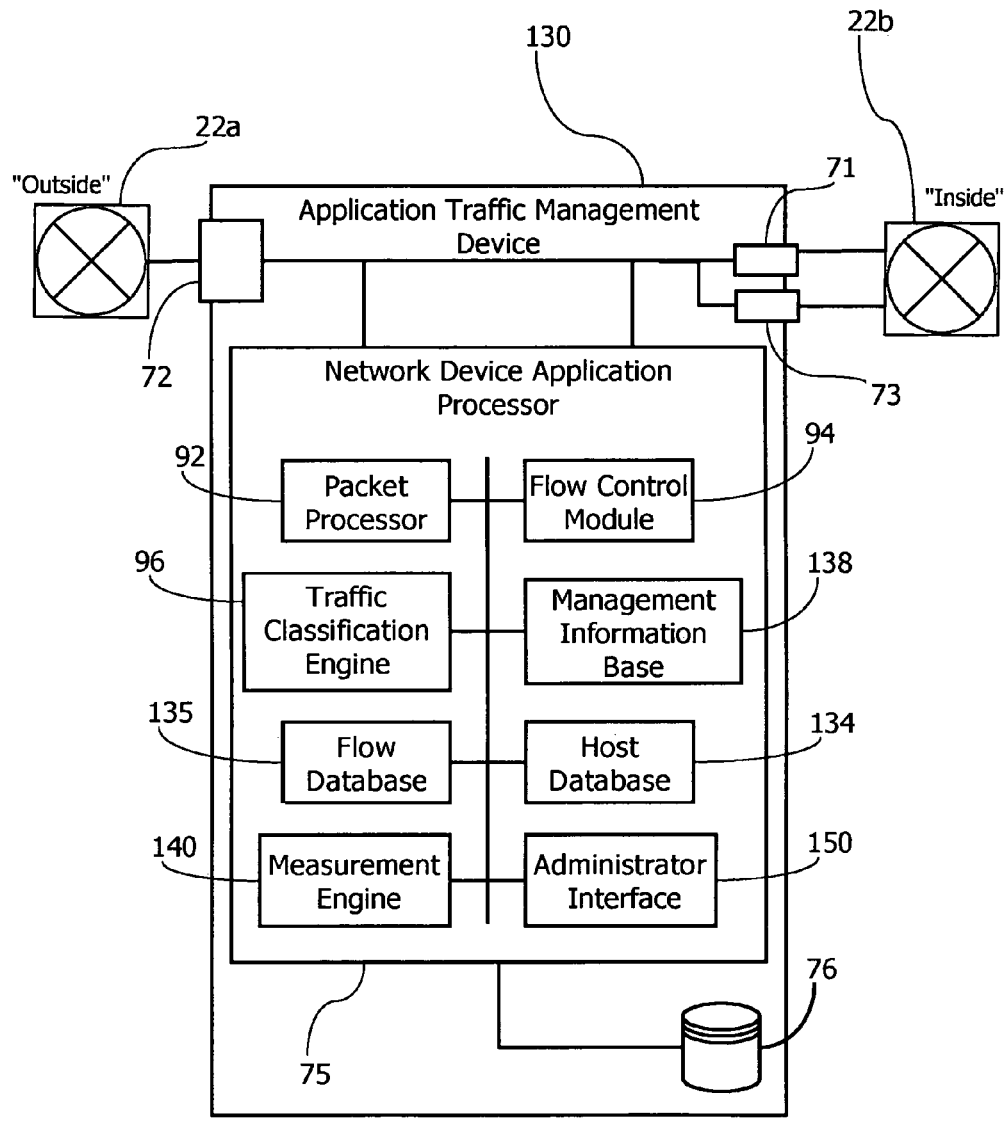
FIG. 3 is a functional block diagram illustrating the functionality of a network application traffic management device, in accordance with an exemplary embodiment.

Before the claimed embodiments are further detailed, FIGS. 3-4 will first be described in order to convey an environment in which those claimed embodiments may operate. As FIG. 3 illustrates, network device 130 may be an application traffic management device deployed at the edge of an autonomous system or network. Network device 130 is merely exemplary and other devices can be used to practice the claimed embodiments. As discussed more fully below, application traffic management device 130 is operative to classify and manage data flows traversing a network path to which the device is operably connected. In one implementation, application traffic management device 130 also includes functionality operative to monitor the performance of the network (such as network latency) and/or network applications.

As FIG. 3 illustrates, network application traffic management device 130, in one implementation, comprises network device application processor 75, and first, second and third network interfaces 71, 72 and 73, which operably connect application traffic management device 130 to routers 22a and 22b. Of course, more than three network interfaces could be included in device 130. Network device application processor 75 generally refers to the functionality implemented by application traffic management device 130, such as network monitoring or reporting, application traffic management, and the like. In one embodiment, network device application processor 75 is a combination of hardware and software, such as a central processing unit, memory, as system bus, an operating system, device drivers, and one or more software modules implementing the functions performed by application traffic management device 130. For didactic purposes, application traffic management device 130 is configured to manage network traffic traversing a network path. In another implementation, application traffic management device 130 may omit a physical network interface dedicated to mirror traffic. In such an implementation, mirror traffic can be encapsulated and tunneled to cooperating network devices over a VLAN or GRE network.

In one embodiment, first and second network interfaces 71, 72 are the network communications interfaces that receive and transmit packets over the computer network environment. Additionally, interface 73 can be used to mirror packets to other network devices. While FIG. 3 illustrates interface 73 connected to a port of router 22b, interface 73 can be connected to router 22a, or another router (not shown). In one implementation, first, second and third network interfaces 71, 72 and 73 reside on separate network interface cards operably connected to the system bus of application traffic management device 130. In another implementation, first and second network interfaces 71, 72 and 73 reside on the same network interface card. In addition, the first, second and third network interfaces 71, 72 and 73 can be wired network interfaces, such as Ethernet (IEEE 802.3) interfaces, and/or wireless network interfaces, such as IEEE 802.11, BlueTooth, satellite-based interfaces, and the like. As FIG. 3 illustrates, application traffic management device 130, in one embodiment, includes persistent memory 76, such as a hard disk drive or other suitable memory device, such writable CD, DVD, or tape drives. In other implementations, application traffic management device 130 can include additional network interfaces, beyond network interfaces 71, 72 and 73, to support additional network paths or other functionality. Furthermore, U.S. application Ser. No. 10/843,185 provides a description of the operation of various modules (according to one possible implementation of the claimed embodiments), such as network interface drivers, and data structures for receiving into memory and processing packets encountered at network interfaces 71, 72 and 73.

As FIG. 3 illustrates, network device application processor 75, in one implementation, includes a packet processor 92, flow control module 94, and traffic classification engine 96. Network device application processor 75, in one implementation, further comprises host database 134, flow database 135, measurement engine 140, management information base 138, and administrator interface 150. In one embodiment, the packet processor 92 is operative to process data packets, such as detecting new data flows, parsing the data packets for various attributes (such as source and destination addresses, and the like) and storing packet attributes in a buffer structure, and maintaining one or more flow variables or statistics (such as packet count, current rate, etc.) in connection with the data flows and/or the source/destination hosts. The traffic classification engine 96, as discussed more fully below, is operative to classify data flows based on one or more attributes associated with the data flows. In one implementation, flow control module 94 is operative to apply aggregate and per-flow bandwidth utilization controls to data flows traversing network paths in the inbound and/or outbound directions.

The host database 134, in one implementation, maintains one or more data flow or other metrics in association with the hosts. In one implementation, the host database, maintains, inter alia, for each IP address 1) the number of concurrent connections (Conn); 2) the current data flow rate (Curr rate); and 3) the average bits per second (bps) over a one-minute interval (1 Min avg). In addition, in one implementation, host database 134 maintains for each host address the following fields: 4) the number of new flows or connections for which the host is a client over the last minute; 5) the number of new flows or connections for which the host is a server over the last minute; and 6) the number of failed flows corresponding to a given host. Additionally, host database 134 may maintain one or more of the following fields which will be explained in more detail in subsequent sections: 7) a mirroring device identifier, 8) a "seen elsewhere" flag, 9) a "new external host" identifier and associated timestamp; and 10) an "experienced asymmetry" flag. Packet processor 92 is operative to identify new data flows, as well as the termination of existing data flows, and updates the statistics identified above as data flows traverse network device. Other functional processing modules, such as measurement engine 140, may access these values, as well as other data structures (e.g., flow database 135) to perform one or more operations on packets and/or data flows.

As discussed above, in one implementation, network device application processor 75 further comprises measurement engine 140, management information base (MIB) 138, and administrator interface 150. Management information base 138 is a database of standard and extended network objects related to the operation of application traffic management device 130. Measurement engine 140 maintains measurement and statistical data relating to operation of application traffic management device 130 to allow for monitoring of bandwidth utilization and network performance across network paths with respect to a plurality of bandwidth utilization and other network statistics on an aggregate, partition, and/or per-traffic-class level.

Administrator interface 150 facilitates the configuration of application traffic management device 130 to adjust or change operational and configuration parameters associated with the device. For example, administrator interface 150 allows administrators to select identified traffic classes and associate them with traffic management policies, such as partitions. Administrator interface 150 also displays various views associated with a hierarchical traffic partitioning scheme and allows administrators to configure or revise the hierarchical traffic partitioning scheme. Administrator interface 150 can provide a command line interface and/or a graphical user interface accessible, for example, through a conventional browser on a client device (not shown).

Figure 4:
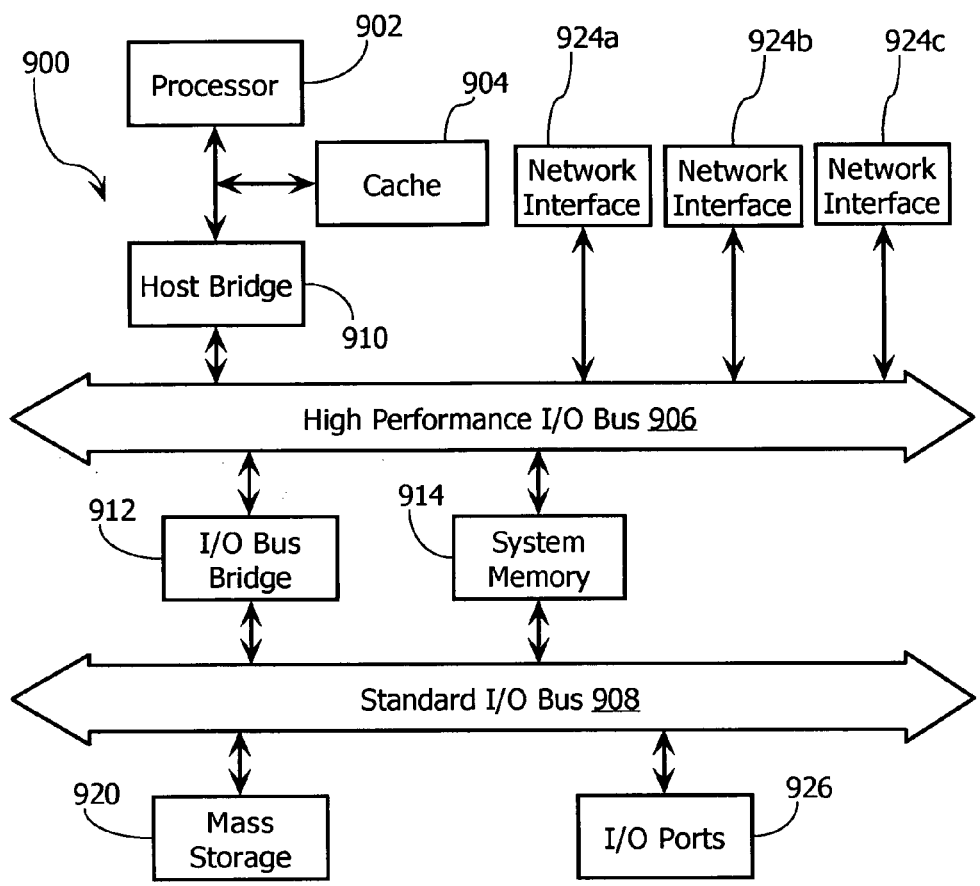
FIG. 4 is a functional block diagram illustrating the hardware components of a network application traffic management device, in accordance with an exemplary embodiment.

FIG. 4 illustrates for didactic purposes an exemplary computing platform, and hardware architecture, for network traffic management device 130. In one implementation, network traffic management device 130 comprises a system 900 including a processor 902, a system memory 914, network interfaces 924a, 924b and 924c, and one or more software applications (including network device application 75 shown in FIG. 3) and drivers enabling the functions described herein.

The claimed embodiments can be implemented on a wide variety of computer system architectures. For example, FIG. 4 illustrates a hardware system having components suitable for network traffic management device 130 in accordance with one implementation of the claimed embodiments. In the illustrated embodiment, the hardware system 900 includes processor 902 and a cache memory 904 coupled to each other as shown. Additionally, the hardware system 900 includes a high performance input/output (I/O) bus 906 and a standard I/O bus 908. Host bridge 910 couples processor 902 to high performance I/O bus 906, whereas I/O bus bridge 912 couples the two buses 906 and 908 to each other. Coupled to bus 906 are network/communication interfaces 924*a*, 924*b* and 924*c*, and system memory 914. The hardware system may further include video memory (not shown) and a display device coupled to the video memory. Coupled to bus 908 are mass storage 920 and I/O ports 926. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of computer hardware system 900 perform their conventional functions known in the art. In particular, network interfaces 924*a*, 924*b* and 924*c* are used to provide communication between system 900 and any of a wide range of networks, such as an Ethernet (e.g., IEEE 802.3) network, etc. Mass storage 920 is used to provide permanent storage for the data and programming instructions to perform the above described functions implemented in the system controller, whereas system memory 914 (e.g., DRAM) is used to provide temporary storage for the data and programming instructions when executed by processor 902. I/O ports 926 are one or more serial and/or parallel communication ports used to provide communication between additional peripheral devices, which may be coupled to hardware system 900.

Hardware system 900 may include a variety of system architectures, and various components of hardware system 900 may be rearranged. For example, cache 904 may be on-chip with processor 902. Alternatively, cache 904 and processor 902 may be packed together as a "processor module," with processor 902 being referred to as the "processor core." Furthermore, certain implementations of the claimed embodiments may not require nor include all of the above components. For example, the peripheral devices shown coupled to standard I/O bus 908 may be coupled to high performance I/O bus 906. In addition, in some implementations only a single bus may exist with the components of hardware system 900 being coupled to the single bus. Furthermore, additional components may be included in system 900, such as additional processors, storage devices, or memories.

As discussed above, in one embodiment, the operations of the network traffic management device 130 described herein are implemented as a series of software routines run by hardware system 900. These software routines comprise a plurality or series of instructions to be executed by a processor in a hardware system, such as processor 902. Initially, the series of instructions are stored on a storage device, such as mass storage 920. However, the series of instructions can be stored on any conventional storage medium, such as a diskette, CD-ROM, ROM, etc. Furthermore, the series of instructions need not be stored locally, and could be received from a remote storage device, such as a server on a network, via network/communication interfaces 924*a*, 924*b* and 924*c*. The instructions are copied from the storage device, such as mass storage 920, into memory 914 and then accessed and executed by processor 902. Other implementations are possible. For example, some or all of the functionality described herein can be embodied in firmware or hardware components, such as application specific integrated circuits, and the like.

An operating system manages and controls the operation of system 900, including the input and output of data to and from software applications (not shown). The operating system provides an interface between the software applications being executed on the system and the hardware components of the system. According to one embodiment of the claimed embodiments, the operating system is the LINUX operating system. However, the claimed embodiments may be used with other conventional operating systems, such as the Windows® 95/98/NT/XP operating system, available from Microsoft Corporation of Redmond, Wash. Apple Macintosh Operating System, available from Apple Computer Inc. of Cupertino, Calif., UNIX operating systems, and the like. Of course, other implementations are possible. For example, the functionality of network traffic management device 130 may be implemented by a plurality of server blades communicating over a backplane in a parallel, distributed processing architecture.

A.1. Packet Processing

As discussed above, packet processor 92, in one implementation, is operative to detect new data flows, instantiate data structures associated with the flows and parse packets to identify packet attributes, such as source and destination addresses, port numbers, etc., and populate one or more fields in the data structures. The U.S. Patents and patent applications identified above discuss the operation of packet processors that can be incorporated into embodiments of the claimed embodiments. In one embodiment, when packet processor 92 encounters a new data flow it stores the source and destination IP addresses contained in the packet headers in host database 134. Packet processor 92 further constructs a control block (flow) object in flow database 135 including attributes characterizing a specific flow between two end systems, such as source and destination addresses, port numbers, etc. Other flow attributes in the flow object may include application specific attributes gleaned from layers above the TCP layer, such as codec identifiers for Voice over IP calls, Citrix database identifiers, and the like. Packet processor 92 also stores meta information relating to the received packets in a packet buffer—a memory space, typically in dynamic random access memory (DRAM), reserved for packets traversing application traffic management device 130. In one embodiment, the packets are stored in the packet buffer with a wrapper including various information fields, such as the time the packet was received, the packet flow direction (inbound or outbound), and a pointer to the flow object corresponding to the flow of which the packet is a part.

In typical network deployments, the majority of data flows are generally TCP or UDP flows. However, any suitable transport layer flow can be recognized and detected. As discussed more fully below, in one embodiment, flows are identified based on the following flow attributes: 1) source IP address, 2) destination IP address, 3) source port number, 4) destination port number, and 5) protocol (derived from the "protocol" field in IPv4 headers, and the "NextHeader" field in IPv6 headers). One skilled in the art will recognize that flows can be identified in relation to a variety of attributes and combinations of attributes. In addition, methods for determining new data flows and assigning packets to existing data flows are well known in the art and also depend on the particular transport layer protocol employed. For a TCP flow, for example, packet processor 92 can determine a new data flow by detecting the packets associated with the initial handshake, such as the SYN, SYN/ACK, and/or ACK packets. However, a new data flow, depending on the network protocol associated with the flow, can simply be a data flow for which there is no corresponding flow object. For example, with UDP and GRE flows (where there is no explicit connection or handshake mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the last packet and the time of the current packet is greater than the threshold, the current packet is deemed part of a new flow. In another implementation, a background and/or separate process can periodically compare the last packet times associated with a flow to a threshold period of time and deem the flow terminated if the last packet time is beyond the threshold period of time. The termination of TCP connections is typically detected by identifying FIN packets; however, the timeout mechanisms discussed above can be used in situations where a FIN packet is not detected.

In one embodiment, a control block (flow) object contains a flow specification object including such attributes as pointers to the "inside" and "outside" IP addresses in host database 134, as well as other flow specification parameters, such as inside and outside port numbers, service type (see below), protocol type and other parameters characterizing the data flow. In one embodiment, such parameters can include information gleaned from examination of data within layers 2 through 7 of the OSI reference model. U.S. Pat. No. 6,046,980 and U.S. Pat. No. 6,591,299, as well as others incorporated by reference herein, disclose classification of data flows for use in a packet-based communications environment. FIG. 3 illustrates the concept associated with inside and outside addresses, where network interface 71 is the "inside" network interface and network interface 72 is the "outside" network interface. As discussed above, in one embodiment, a flow specification object includes an "inside" and "outside" address relative to application traffic management device 130. See FIG. 3. For non-mirrored traffic, packet processor 92 can compute the inside and outside addresses based on the network interface on which the traffic was received. For mirrored traffic, the packets can be marked to indicate which host is the external host. For example, the mirrored packet traffic can be encapsulated, where a bit or field in the encapsulating header indicates which host is the external host. In other implementations, a portion of the mirrored packet can be overwritten with one or more fields (such as in the payload) to identify the external host. In another implementation, the external host can be identified by comparing the host addresses to BGP or other routing information. Still further, packet processor 92 can also identify which host is the client and which host is the server for a given data flow and store this information in the flow specification or flow object. The identification of a server or client in a given transaction generally depends on the network protocols employed by the hosts. For example, in TCP flows, a client typically starts a transaction by transmitting a SYN packet to initiate a TCP connection. Application traffic management device 130 can detect the SYN packet and note the source network address of the packet as the client host, and the destination address as the server host. One of ordinary skill in the art will recognize how to identify clients and servers in connection with other networking protocols.

In one embodiment, packet processor 92 creates and stores flow objects corresponding to data flows in flow database 135. In one embodiment, flow object attributes include a pointer to a corresponding flow specification object, as well as other flow state parameters, such as TCP connection status, timing of last packets in the inbound and outbound directions, current observed running rate, apparent round trip time, packet count, etc. Flow object attributes further may include at least one traffic class identifier or network application identifier (or pointer(s) thereto) associated with the data flow, as well as policy parameters (or pointers thereto) corresponding to the identified traffic class. In one embodiment, flow objects further include a list of traffic classes for which measurement data (maintained by measurement engine 140) associated with the data flow should be logged. In one embodiment, to facilitate association of an existing flow object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding flow object. According to this embodiment, to identify whether a flow object exists for a given data flow, packet processor 92 hashes the values identified above and scans the hash table for a matching entry. If one exists, packet processor 92 associates the pointer to the corresponding flow object with the packets in the data flow.

A.2. Traffic Classification Engine

As discussed above, traffic classification engine 96, in one implementation, is operative to classify data flows, such as identifying one or more network applications or traffic types corresponding to the data flows. Traffic classification engine 96, in one implementation, comprises a plurality of service type identification modules, each of which correspond to a set of service types. Each service type identification module analyzes one or more packets in a given data flow to attempt to identify a service type corresponding to the flow. A service type, in one implementation, can be a network protocol, a service, or a network-application. For example, one service type identification module can correspond to a network application, such as Citrix®, while another service type identification module can be dedicated to detecting Oracle® or PostgreSQL database traffic. Still other service type identification modules can classify HTTP flows, FTP flows, ICMP flows, RTP flows, NNTP, SMTP, SSL, QICOM and the like. In one implementation, traffic classification engine 96 passes pointers to received packets to each service type identification module, which then inspect the packets stored in the buffer memory. In one implementation, each service type identification module has an associated packet count threshold (in the aggregate, packets from server to client, or client to server) after which it no longer attempts to classify a data flow. In one implementation, the packet count threshold will vary across the service type identification modules. For example, a service type identification module dedicated to classifying Citrix® traffic may be able to classify a data flow with certainty after three packets. In many instances, application traffic management device 130 may have to encounter more than one packet corresponding to a data flow in order to finally classify the data flow. For example, the initial TCP handshake packets may only reveal IP address, port numbers and protocol identifiers. While this information may be sufficient to identify some instances of HTTP traffic, for example, additional packets (such as data packets) may reveal a more specific network application, such as an accounting application or peer-to-peer file sharing application, that utilizes HTTP. Accordingly, in one implementation, each service type identification module responds to receiving a pointer to a packet by 1) reporting a matching service type identifier and the desire to inspect more packets in the flow (to possibly identify a more specific service type identifier); 2) reporting a matching service type and no interest in inspecting subsequent packets in the flow; 3) reporting no matching service type identifier and the desire to inspect more packets in the flow; and 4) reporting no matching service type and no interest in inspecting subsequent packets in the flow.

To facilitate identification of service types (e.g., FTP, HTTP, etc.), traffic classification engine 96, in one embodiment, is supported by one to a plurality of service identification tables in a database that allow for identification of a particular service type (e.g., application, protocol, etc.) based on the attributes of a particular data flow. Of course, other suitable data structures can be used to support the identification of service types, such as a set of hard-coded instructions, an XML file, and the like. In one embodiment, a services table including the following fields: 1) service ID, 2) service aggregate (if any), 3) name of service, 4) service attributes (e.g., port number, outside IP address, etc.), and a 5) default bandwidth management policy. A service aggregate encompasses a combination of individual services (each including different matching criteria, such as different port numbers, etc.) corresponding to the service aggregate. When application traffic management device 130 encounters a new flow, the service type identification modules of traffic classification engine 96 analyze the data flow against the service attributes in their respective services tables to identify a service ID corresponding to the flow. In one embodiment, traffic classification engine, 96 may identify more than one service ID associated with the flow. In this instance, traffic classification engine 96 associates the more/most specific service ID to the flow. For example, network traffic associated with a peer-to-peer file sharing service may be identified according to a network protocol, such as TCP or HTTP traffic, as well as higher level, application-specific traffic types such as the actual file sharing application itself (e.g., Napster, Morpheus, etc.). In this instance, traffic classification engine 96 associates the flow with the most specific service ID. As a further example, an RTSP application data flow can be further classified to RTSP-Broadcast or RTSP-REALNET-TCP in the middle of the flow after a particular signature in the packets is encountered. In one implementation, traffic classification engine 96 writes the identified service type ID into the control block (flow) object corresponding to the data flow.

As discussed more fully below, service type identification, in one implementation, is a preliminary operation to the classification of a data flow according to the traffic classification scheme configured by a network administrator. For example, a traffic class maintained by traffic classification engine 96 may be configured to include matching rules based on the service IDs in the services table. For example, a matching rule directed to HTTP traffic may simply refer to the corresponding service ID, as opposed to the individual attributes that the service type identification modules uses to initially identify the service. This implementation allows for a variety of traffic classification configurations, such as the configuration of child traffic classes that further classify HTTP traffic on the basis of a network application, a range of IP addresses, and the like. Still further, the service type identifiers can correspond to a specific network application (e.g., Napster, Citrix, NetIQ, Oracle, Skype, etc.) and more generally to network protocols or services, such as IP, TCP, HTTP, SOAP, XML, UDP, FTP, SMTP, etc.

A traffic class comprises a set of matching rules or attributes allowing for logical grouping of data flows that share the same characteristic or set of characteristics. In one implementation, the matching rules can correspond to the service type identifiers discussed above, as well as other data flow attributes, such as whether the server is the inside or outside host (see above), non-standard and standard port numbers, host IP address or subnet, application-specific strings, diffserv codes, MPLS tags, VLAN tags, and the like. In one embodiment, each traffic class has at least one attribute defining the criterion(ia) used for identifying a specific traffic class. In one implementation, the attributes defining a given traffic class can be based on explicitly presented attributes of one or more packets corresponding to a data flow. The U.S. Patent applications identified above disclose various network traffic classification mechanisms that can be incorporated into embodiments of the claimed embodiments. For example, a traffic class can be defined by configuring an attribute defining a particular IP address or subnet. Of course, a particular traffic class can be defined in relation to a plurality of related and/or orthogonal data flow attributes. U.S. Pat. Nos. 6,412,000 and 6,591,299, and U.S. patent application Ser. No. 10/039,992 describe some of the data flow attributes that may be used to define a traffic class, as well as the use of hierarchical classification structures to associate traffic classes to data flows. In one embodiment, application traffic management device 130 includes functionality allowing for classification of network traffic based on information from layers 2 to 7 of the OSI reference model. Application traffic management device 130 can be configured to include matching rules that define a plurality of network applications commonly found in enterprise networks, such as database applications, Citrix® flows, ERP applications, and the like.

Traffic classification engine 96, in one implementation, stores traffic classes associated with data flows that traverse network paths of which device 130 lies between. Traffic classification engine 96, in one embodiment, stores the traffic classes and corresponding data (e.g., matching rules, policies, partition pointers, etc.) related to each traffic class in a hierarchical tree. For example, at one level a traffic class may be configured to define a particular user group or subnet, while additional child traffic classes can be configured to identify specific application traffic associated with the user group or subnet. U.S. application Ser. No. 10/334,467, as well as other patents and patent applications identified above, disclose how traffic classification engine 96 traverses the hierarchical tree to match a data flow to a leaf traffic class node.

In one embodiment, the root traffic classifications are "/Inbound" and "/Outbound" data flows. Any data flow not explicitly classified is classified as "/Inbound/Default" or "/Outbound/Default". In other implementations, the concept of "inbound" and "outbound" is replaced by a set of policies corresponding to pairs of network interfaces, such as interfaces 71 (or 73) and 72, and the direction of packet traffic. For example, packets flowing from network interface 71 to network interface 72 (and vice versa) can be classified on that basis to eliminate any potential restrictions on classification of data flows in different network topologies. In one embodiment, traffic classification engine 96 attempts to match to a leaf traffic class node before proceeding to remaining traffic class nodes in the hierarchical configuration. If a traffic class is found, the traffic classification engine 96 stops the instant search process and returns the identified traffic classification. Of course, one skilled in the art will recognize that alternative ways for traversing the hierarchical traffic class configuration can be implemented. For example, traffic classification engine 96 may be configured to traverse all traffic class nodes at a given level before proceeding to lower levels of the traffic classification tree.

In one embodiment, administrator interface 150 displays the traffic class tree and allows for selection of a traffic class and the configuration of policy (such as a partition) for that traffic class. Application traffic management device 130 further allows an administrator to manually create a traffic class by specifying a set of matching rules and also automatically creates traffic classes by monitoring network traffic across network paths that device 130 is installed between and classifying data flows according to a set of criteria to create matching rules for each traffic type. In one embodiment, each traffic class node includes a traffic class identifier; at least one traffic class (matching) attribute; at least one policy parameter (e.g., a partition identifier, etc.), a pointer field reserved for pointers to one to a plurality of child traffic classes.

A.3. Flow Control Module

As discussed above, flow control module 94 enforces bandwidth utilization controls (and, in some embodiments, other policies) on data flows. A bandwidth utilization control for a particular data flow can comprise an aggregate control bandwidth utilization control (e.g., a partition), a per-flow bandwidth utilization control (e.g., a rate policy), or a combination of the two. Flow control module 132 may incorporate any or a subset of the TCP rate control functionality described in the cross-referenced U.S. patents and/or patent applications set forth above for controlling the rate of data flows. Application traffic management device 130, however, can also be configured to implement a variety of different policy types, such as security policies, admission control policies, marking (diffserv, VLAN, etc.) policies, redirection policies, caching policies, transcoding policies, and network address translation (NAT) policies. Of course, one of ordinary skill in the art will recognize that other policy types can be incorporated into the claimed embodiments. In one implementation, flow control module 94 includes a partitioning module operative to enforce aggregate bandwidth utilization controls (e.g., partitions), and a per-flow rate control module operative to apply per-flow rate controls on data flows. In addition, in one implementation, flow control module 94 implements the TCP Rate Control technologies disclosed in U.S. Pat. No. 6,038,216 to control the rate at which transmitters send data and therefore the amount of data that is queued in buffers at network traffic management device 130.

B. Traffic Synchronization Across Multiple Devices in WAN Topologies

Figure 5:
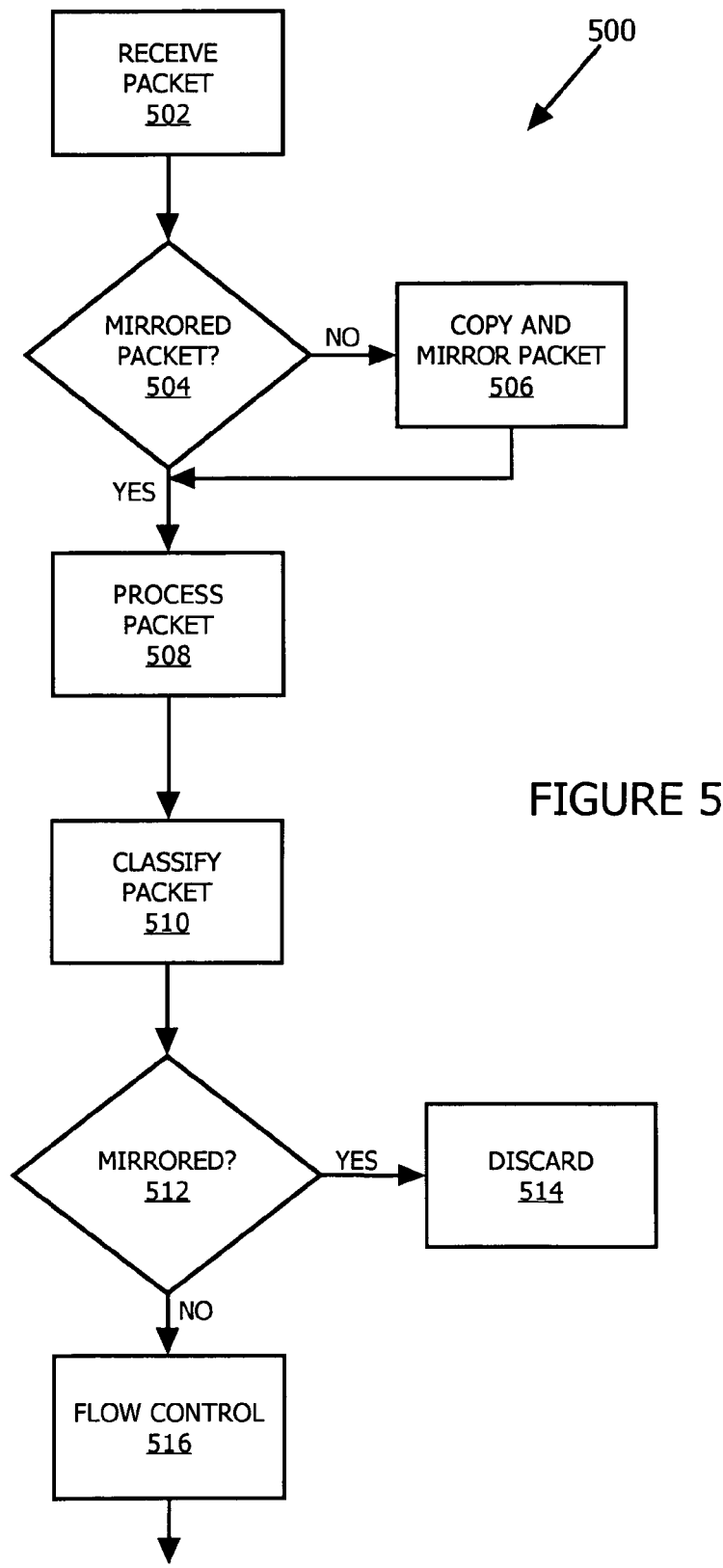
FIG. 5 is a flow chart diagram illustrating a method for mirroring and classifying packets, in accordance with an exemplary embodiment.

Now that an exemplary framework for practicing the claimed embodiments has been described, those claimed embodiments will now be discussed beginning with FIG. 5 which is a flow chart diagram illustrating a method 500 for mirroring packets and classifying data flows, in accordance with an exemplary embodiment. In the implementation of method 500, all received packets are mirrored, if the received packets themselves are not mirrored packets from another network device. If the received packet is a mirrored packet, network device 130 examines the packet, updating the classification state for the data flow, and discards the mirrored packet as it is no longer needed.

Initially, device 130 receives a packet (502) and determines if it is a mirrored packet (504). If the packet is not a mirrored packet (504), then device 130 copies and mirrors the packet (506). Next, device 130 processes the packet (508) which can include parsing the packet, identifying a data flow related to the packet, identifying one or more newly detected hosts associated with the data flow, and entering the associated data into flow and host databases. In turn, device 130 classifies a data flow associated with the packet (510) and performs a second determination to see if the packet is a mirrored packet (512). If yes, device 130 discards the packet (514) as it is no longer needed. Otherwise, device 130 passes the packet to flow control module 94, which applies one or more flow control or other policies to the packet (516).

Figure 6:
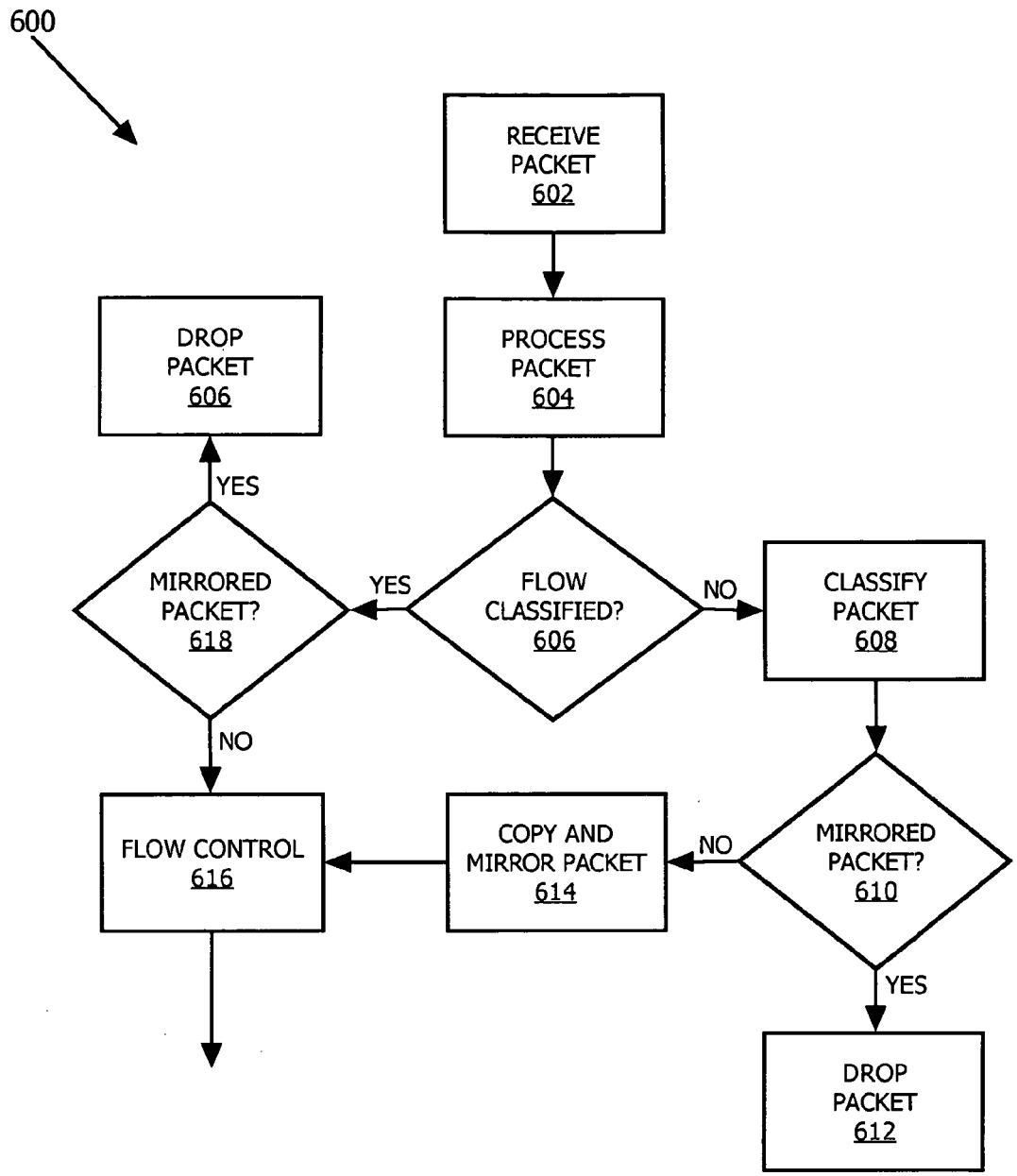
FIG. 6 is a flow chart diagram illustrating a method for mirroring packets until a related data flow is classified, in accordance with an exemplary embodiment.

While method 500 would certainly keep all network devices, contained in an autonomous system, up-to-date in view of asymmetric data flows, it typically is unnecessary to continue to mirror packets after a data flow has been classified. Restated, when one network device is able to classify a data flow based on a certain number of packets, other network devices are capable of reaching the same classification decision based on the same number, of packets. For example, in the embodiment described above, traffic classification engine 96 includes one or more service type identification modules that return an indication of whether it will accept additional packets. Therefore, mirroring more packets beyond what is necessary for classification is generally not required. To that end, FIG. 6 is a flow chart diagram illustrating a method 600 for mirroring packets until a related data flow is classified (or until all service type identification modules have signaled that they will not accept additional packets associated with the data flow), in accordance with an exemplary embodiment. Generally described, method 600 provides for the network device 130 to receive a data flow that includes one or more packets, mirror the packets until the flow is classified and discontinue the mirroring of the packets once the flow has been classified.

First, device 130 receives a packet (602) and processes a packet (604). Similar to operation 508 of method 500/FIG. 5, processing the packet (604) entails parsing the packet, identifying a data flow related to the packet and entering the associated data into a host data base. Next, device 130 determines if classification operations for the data flow associated with the packet have been exhausted (606). If not, device 130 passes the packet to traffic classification engine 96 (610) and determines if the packet is a mirrored packet (610). If the packet is a mirrored packet, device 130 discards the packet. Otherwise, device 130 copies and mirrors the packet to other devices on the mirror network cloud and applies flow control policies to the packet (616). If the flow is classified (606) and the packet is a mirrored packet (618), device 130 discards the packet (620). If the packet is a mirrored packet (618), device 130 applies flow control policies to the packet (616).

Figure 7:
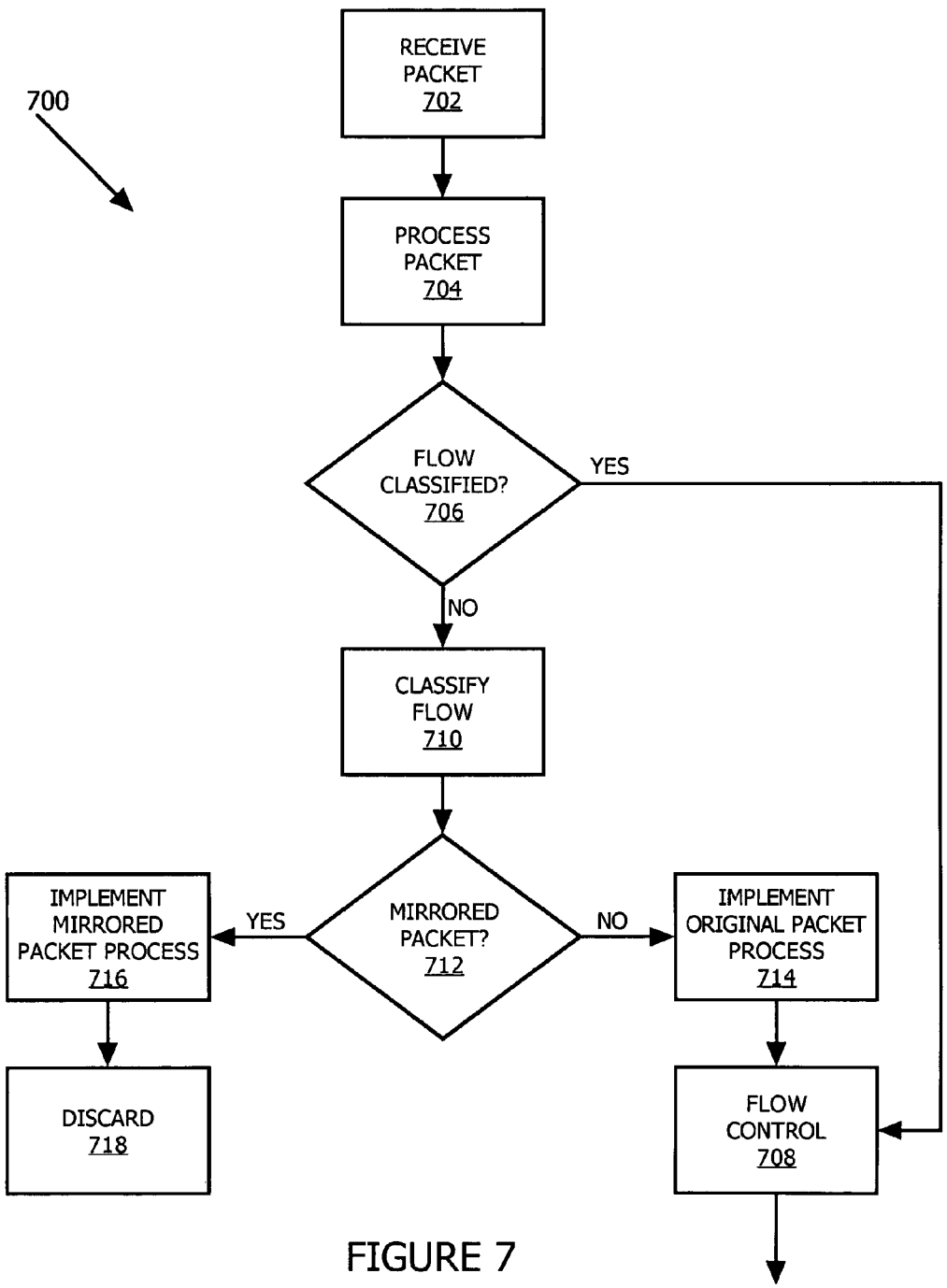
FIG. 7 is a flow chart diagram illustrating a method for implementing a generic mirroring process, in accordance with an exemplary embodiment.

Method 600 does have a drawback in that classification packets (i.e., the initial N packets in a data flow that are examined for classification purposes) of data flows are mirrored even if the data flow is not asymmetric. Therefore, several embodiments will be presented that addresses this drawback. However, a method 700 for implementing a generic mirroring process will first be presented via FIG. 7 and that method 700 is applicable to several optimizations that address this drawback. Stated succinctly, method 700 provides for device 130 to receive and process a packet and further to pass the packet to a flow control module, if it is already classified. If not already classified, device 130 classifies the packet and determines if it is a mirrored packet. If no, device 130 passes the packet to a flow control module. Otherwise, device 130 applies a mirrored packet process and discards the packet if the packet is a mirrored packet.

Similar to methods 500 and 600, device 130 receives and processes a packet, and determines if the data flow associated with the packet has been classified (702, 704, 706). If the flow is classified, device 130 applies flow control policies to the packet (708). Otherwise, device 130 passes the packet to a traffic classification engine to classify the data flow to which the packet corresponds (710), and then determines if the packet is a mirrored packet (712). If the packet is not a mirrored packet, device 130 implements an original packet process (714) and applies flow control to the packet (708). If the packet is a mirrored packet, device 130 implements a mirrored packet process (716) and discards the packet (718). The generic processes of operations 714 and 716 will be explored in the next several embodiments. Specifically, operation 714 will be more fully detailed via methods 800, 950, 1000, 1100 and 1300 of FIGS. 8, 9, 10, 11 and 13, respectively. Operation 716 will be more explored via method 1200 of FIG. 12.

Figure 8:
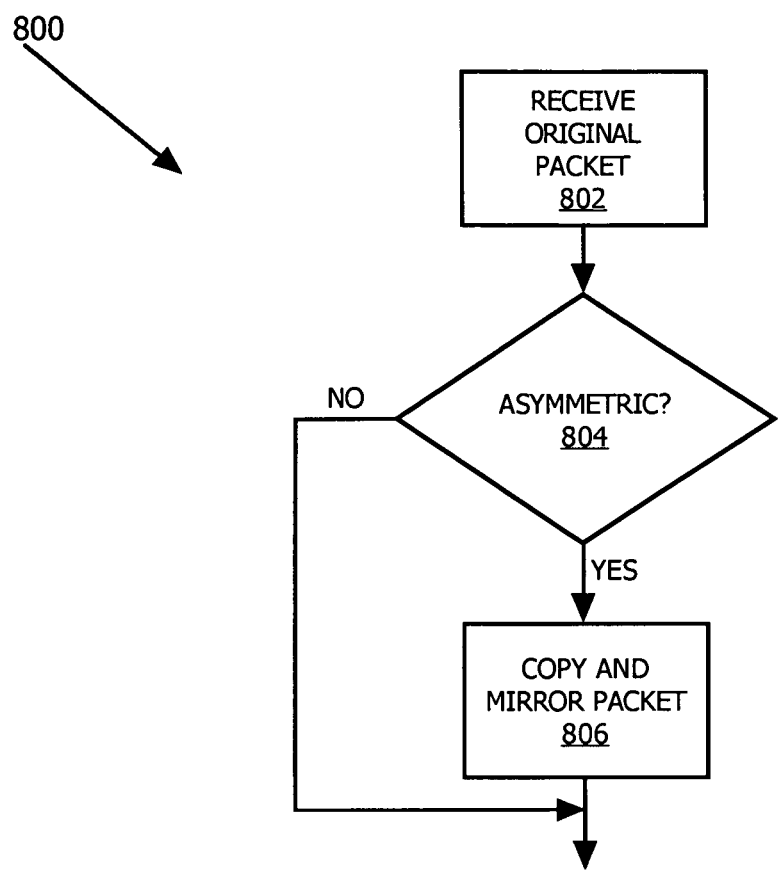
FIG. 8 is a flow chart diagram illustrating a method for mirroring packets upon asymmetric detection, in accordance with an exemplary embodiment.

One option to avoid unnecessary mirroring of packets of flows is to only mirror packets of data flows that are detected to be asymmetric. There are numerous ways of detecting when a data flow becomes asymmetric such as encountering an ACK and/or data packets of a data flow at a particular network device when that device did not encounter the SYN packet corresponding to the same data flow. FIG. 8 is a flow chart diagram illustrating a method 800 for mirroring packets upon detection of asymmetry, in accordance with an exemplary embodiment. If device 130 utilizes method 800, device 130 will mark an "experienced asymmetry" flag in its host database 134 if an asymmetric data flow is detected in relation to a particular external host. When new flows appear that involve that external host, device 130 will mirror the flow as the "experienced asymmetry" flag is marked for that external host.

Method 800 begins with device 130 receiving an original data packet (802). In turn, device 130 determines if a data flow associated with the packet is asymmetric (804). As mentioned above, this accomplished by checking the experienced asymmetry flag in the device's host database. If the flow is asymmetric (806), or likely will be asymmetric since previous flows involving that host were asymmetric, device 130 will copy and mirror the packet to other network devices (806). Otherwise, device 130 does not mirror the packet.

While method 800 advantageously limits mirroring of packets to flows that are asymmetric/likely to be asymmetric, there is a delay, in method 800, before packets, of an asymmetric data flow for a new host, will be mirrored. One way to get around this is to have device 130 mirror traffic for all new external hosts for a time period. If the data flow becomes asymmetric during the time period, then device 130 will continue to mirror packets of the data flow. Otherwise, device 130 will stop mirroring new flows associated with the external host.

Figure 9:
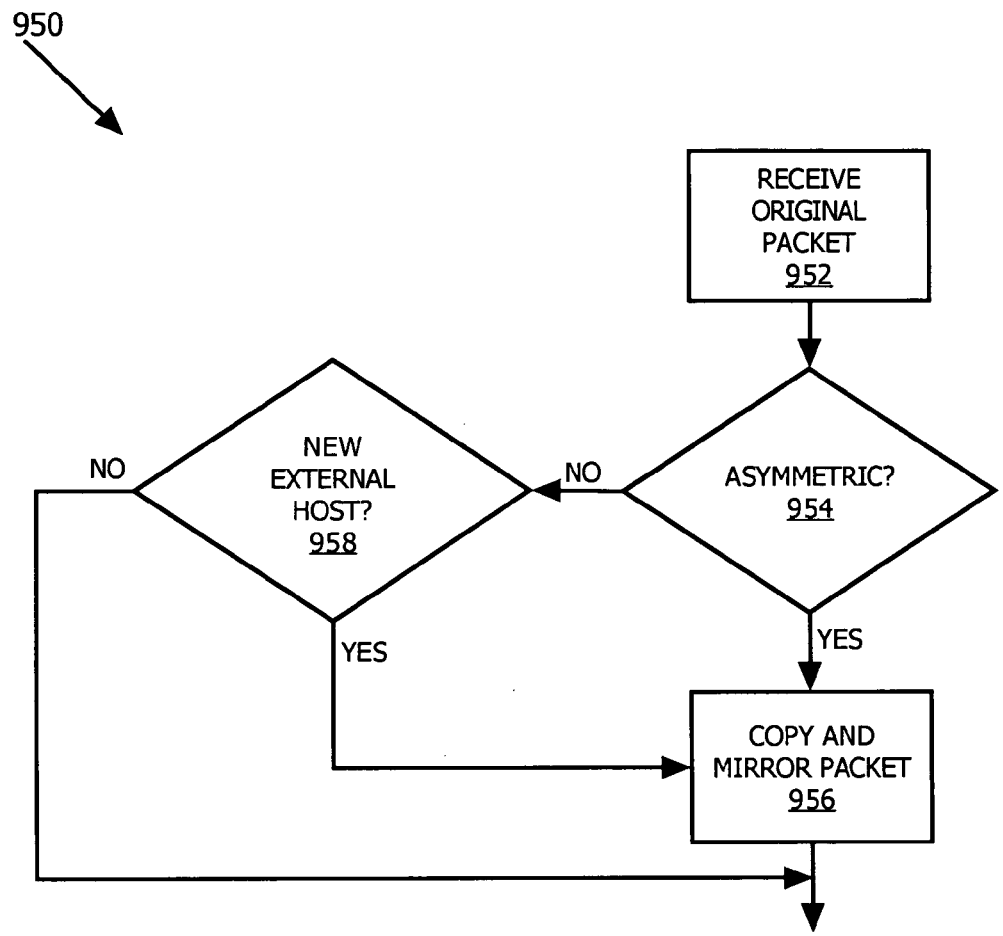
FIG. 9 is a flow chart diagram illustrating a method for mirroring packets upon asymmetric detection and for data flows associated with a new external host; in accordance with an exemplary embodiment.

To further illustrate, method 950 of FIG. 9 provides for device 130 to receive a packet (952) and determine if the packet is associated with an external host where asymmetric data flows have been observed (causing an "experienced asymmetry" flag or identifier to be set in connection with the external host) (954). The method of performing this determination is the same as that of method 800. If the packet or data flow is associated with an "asymmetric" external host (see 954), then device 130 will copy and mirror the packet (956) to the other cooperating network devices. If the packet is not associated with an asymmetric host (954), device 130 determines if the packet is associated with a new external host (958). In this implementation, a new external host is an external host added to the host database within a threshold period of time. After this threshold period of time, the external host is not considered new. If the host is a new external host, device 130 copies and mirrors packets of the data flow to other network devices (956). In one implementation, the host database of a network device, such as device 130, is typically a finite memory space. Since it is a finite memory space, Least Recently Used ("LRU") host entries may be deleted to accommodate new hosts.

Figure 10:
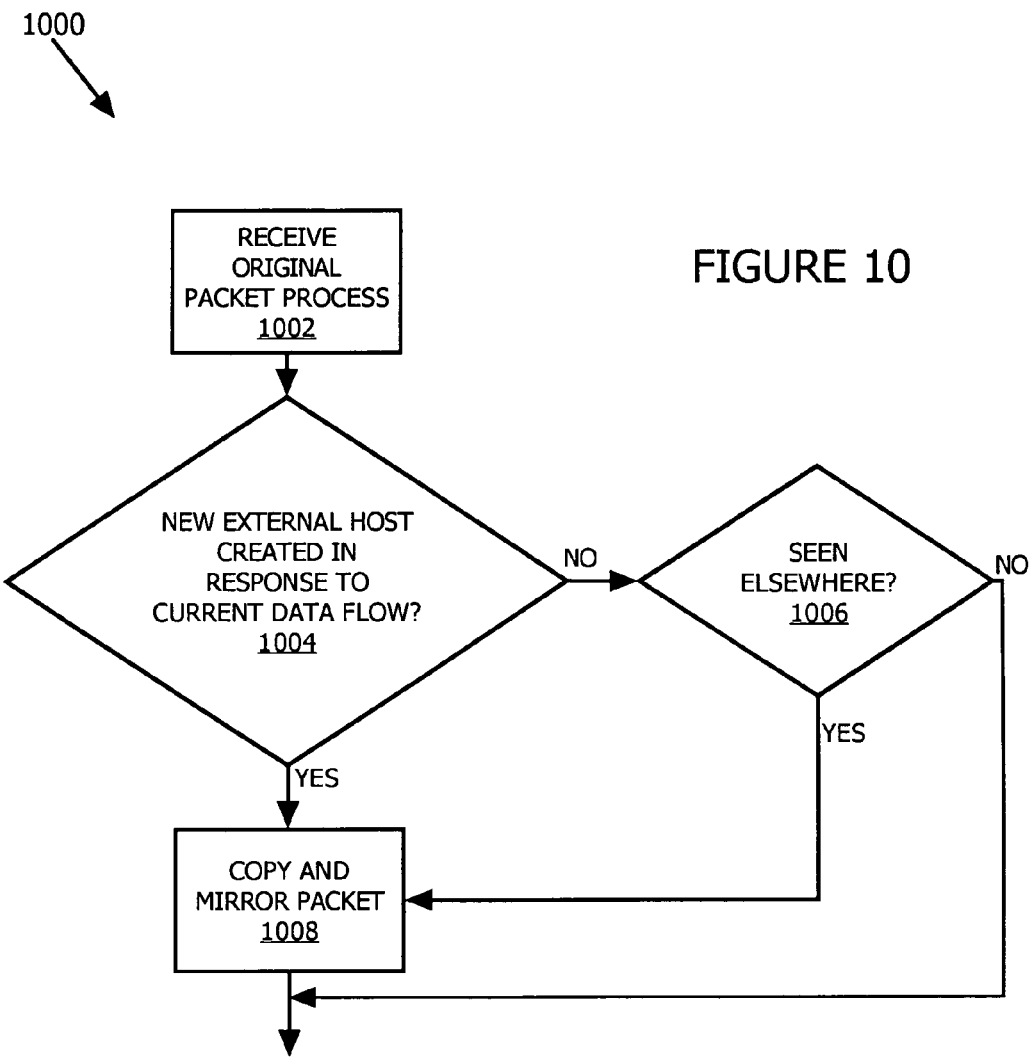
FIG. 10 is a flow chart diagram illustrating a method for mirroring packets for data flows associated with a new external host and mirroring packets associated with an external host that was previously associated with a data flow, in accordance with an exemplary embodiment.

Method 1000 of FIG. 10 is a method for selectively mirroring packets for data flows associated with a new external host, in accordance with an exemplary embodiment. In contrast to method 900, a device 130 utilizing method 1000 will mirror flows associated with new hosts until the flow is classified. At the other network devices that received the mirrored traffic, a "seen elsewhere" flag (see FIG. 12, below) is marked for the new host in each host database of the network devices. When future flows associated with the new host are detected at one of those network devices, that network device will mirror classification traffic to the other network devices since the seen elsewhere flag was previously set.

Firstly, network device 130 receives a packet, executes a receive original packet process (1002) and determines if the new external host entry in host database 134 was created in response to the current data flow (1004). If no, device 130 further checks to see if a "seen elsewhere" flag has been marked for the external host associated with the data flow. If no, device 130 performs other processing on the packet. If the packet process is associated with a new external host (1004) or the seen elsewhere flag is marked for the associated host (1006), device 130 copies and mirrors the packet (1008) to the other cooperating network devices until classification occurs.

Method 1000 can be modified to additionally copy and mirror packets related to indicator traffic. As previously described, indicator traffic comprises a specific classification characteristic of the data flow that facilitates classification of other data flows at the one or more other network devices. For example, a network device can retain a characteristic of a packet that it discovered when that packet was traveling between nodes A and B. That characteristic can then perhaps be used to classify traffic between nodes A and C or even perhaps between nodes C and D.

Figure 11:
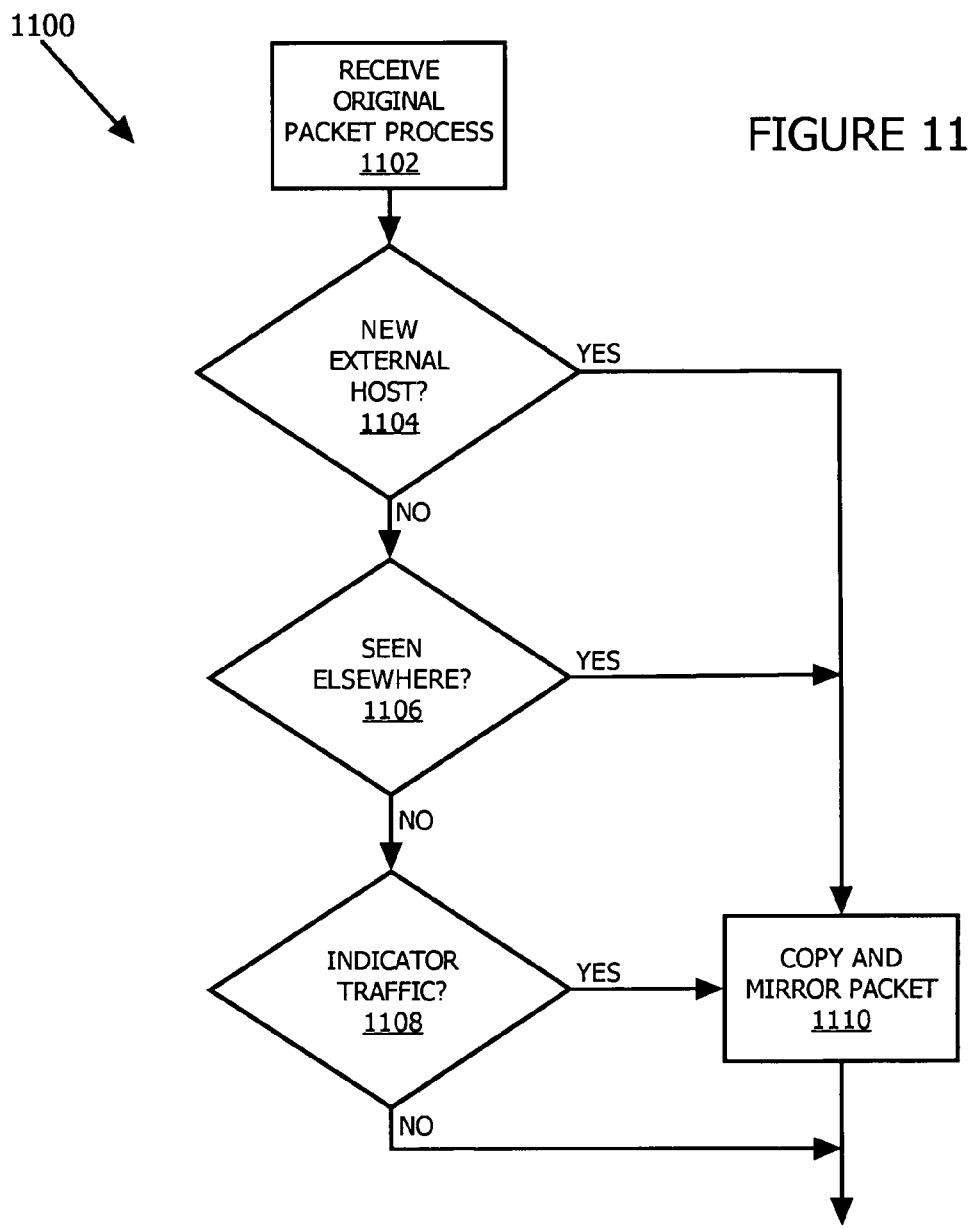
FIG. 11 is a flow chart diagram illustrating a method for mirroring packets upon asymmetric detection, mirroring data flows associated with a new external host and mirroring indicator traffic, in accordance with an exemplary embodiment.

Method 1100, as shown in FIG. 11, accounts for indicator traffic. When device 130 executes a receive original packet process (1102), responsive to receiving an original packet, the device 130 determines (1) if the packet of the corresponding data flow is associated with a new external host (1104), (2) if the seen elsewhere flag associated with the external host has been set (1106), and/or (3) if the packet includes indicator traffic (1108). If yes to any one of operations 1104, 1106 and 1108, device 130 copies and mirrors the packet to other network devices. Otherwise, device 130 performs other processing on the packet.

Figure 12:
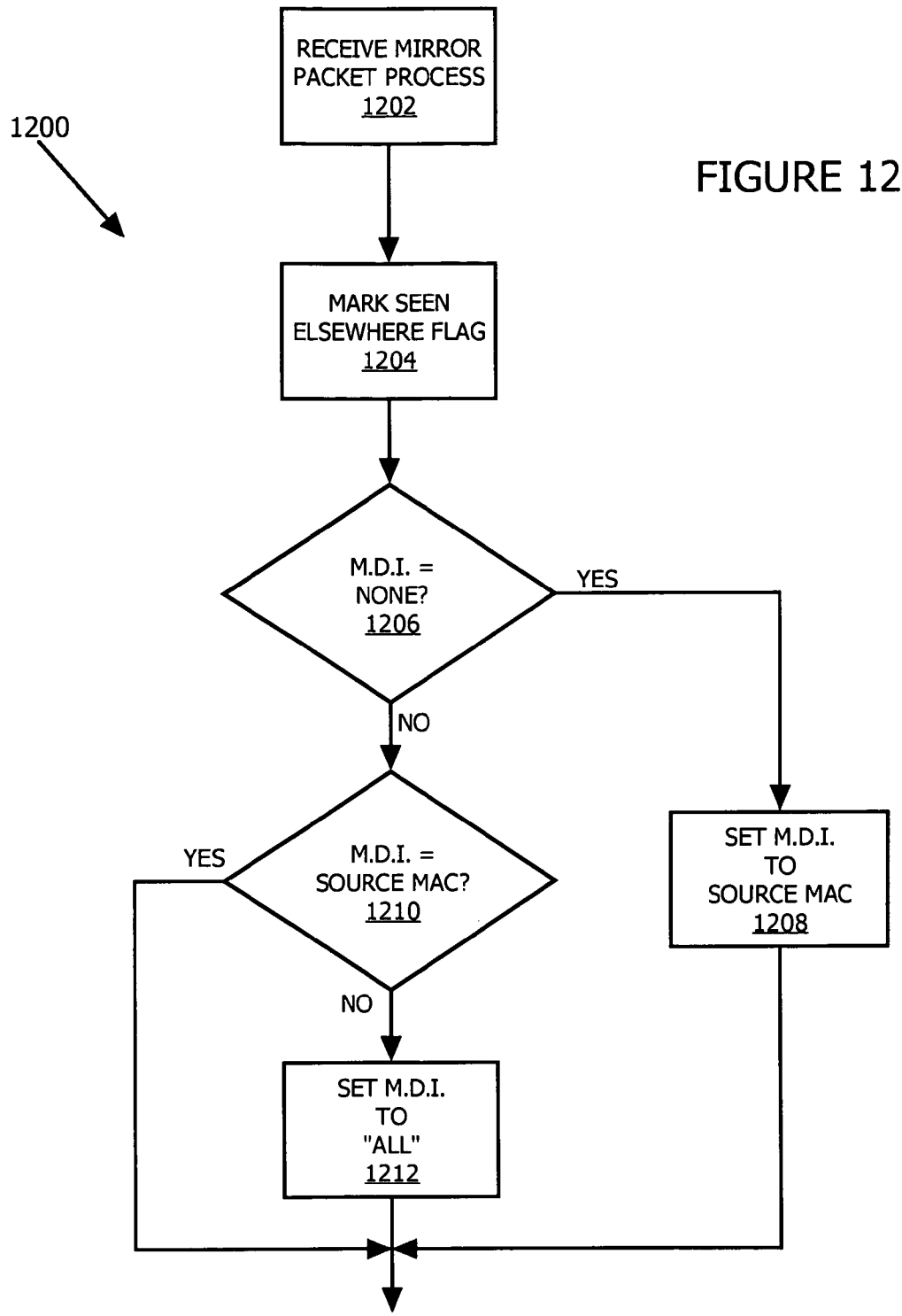
FIG. 12 is a flow chart diagram illustrating a method for setting a mirroring device identifier that determines where to mirror packets to, in accordance with an exemplary embodiment.
Figure 13:
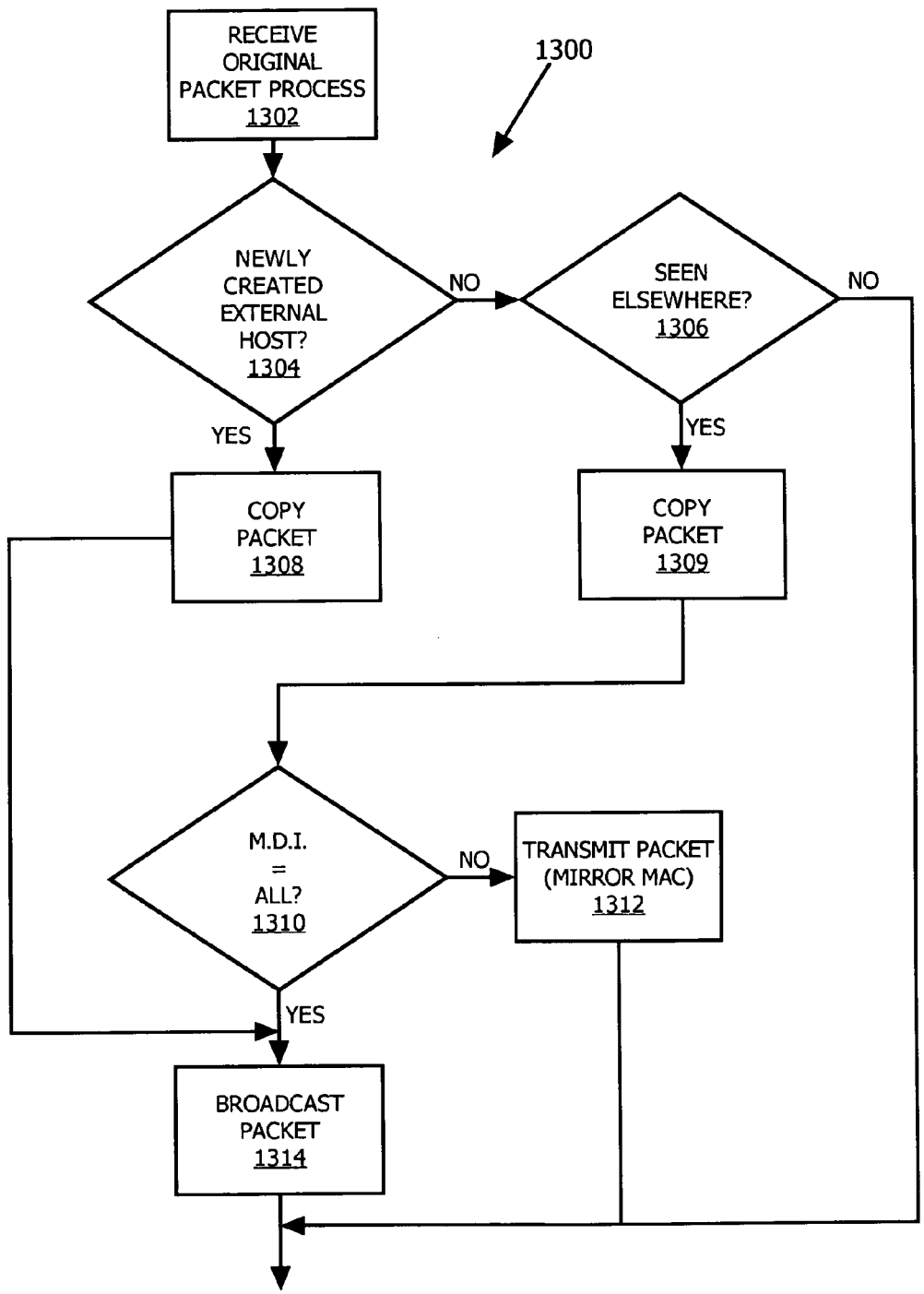
FIG. 13 is a flow chart diagram illustrating a method for mirroring packets utilizing a mirroring device identifier.

When a device 130 mirrors packets utilizing the above-described embodiments, the device 130 mirrors packets to all of the other cooperating network devices. Typically, however, an asymmetric data flow may only involve two network devices. Due to this, it is desirable to limit the mirroring of packets to only those two network devices. Methods 1200 and 1300 of FIGS. 12-13 provide for mirroring of packets to only two network devices, when possible to do so. This is accomplished thru the use of a mirroring device identifier set, at each network device, corresponding to an external host. The mirroring device identifier controls to which network device(s) a network device will mirror packets of a given external host based on the current setting of the identifier. Method 1200 details how device 130 handles received mirrored packets while method 1300 details how device 130 handles mirroring of packets to other devices.

The possible states for the mirroring device identifier can include: 1) not set, 2) mirror to a specific network device, or 3) mirror to all network devices (all). Additionally, when device 130 sends or receives a mirrored packet, the network device identifier may be changed depending on a current value. This is done in an attempt to narrow down the mirroring to only two network devices when the asymmetric flow only involves those two network devices. In one implementation, the various states for the mirroring device identifier change, for a given flow, according to the following summary:

a) Initially, the mirroring device identifier for an external host is set to "not set." For new external hosts, this causes mirroring of the classification packets of the data flow to all other cooperating network devices. For other external hosts, the device does not mirror packets when the mirroring device identifier is not set;
  b) When a mirrored packet is received at the device 130 and the mirroring device identifier is not set, the device 130 sets the mirroring device identifier to correspond to the source network device that mirrored the packet; and
  c) When a mirrored packet is received at the device 130 and the mirroring device identifier has been set to a specific network device, and the current mirrored packet is sourced from a different network device, the device changes the mirroring device identifier to "all" to broadcast or multicast the all classification packets associated with the corresponding external host to the other cooperating network devices.

Referring to FIG. 12 which illustrates method 1200, device 130 first receives a mirror packet process (1202) and marks a seen elsewhere flag (1204) for the associated external host in the device 130's host database. Next, device 130 checks to see if the mirroring device identifier ("M.D.I.") is not set/none (1206). If yes, device 130 sets the mirroring device identifier to the source network device that mirrored the packet (1208). If the result of operation 1206 is negative, device 130 next checks to see if the mirroring device identifier is already set to a specific network device. If the current mirrored packet is sourced from a different network device, the device changes the mirroring device identifier to "all" to broadcast or multicast the all, classification packets associated with the corresponding external host to the other cooperating network devices (1212). Otherwise, device 130 performs other processing.

In one implementation, method 1200 does not include operation 1204 wherein the "seen elsewhere" flag is marked for the external host. Such an implementation would also require the modification of operation 1106 in FIG. 11 to determine whether the value of the mirroring device identifier for the external host is "not set."

The methods and processes described herein can operate in a number of environments such as autonomous systems using a link layer-type connection operated by a switch and MAC addresses of individual network devices to mirror packets. Another environment can comprise an autonomous system that utilizes a VLAN to broadcast mirror packets to one or more cooperating network devices operatively disposed in the autonomous system. FIG. 13 illustrates another possible implementation of the present invention. There are some differences between method 1100 of FIG. 11 and method 1300 of FIG. 13. One difference is that method 1100 includes an indicator traffic check. Another difference is that method 1300 has a mirroring device identifier check. In one implementation, method 1100 includes a mirroring device identifier check. In another implementation, method 1300 includes an indicator traffic check.

A device 130 that utilizes method 1300, in one implementation, executes a receive original packet process (1302) and determines if the entry in host database 134 has been newly created in response to the data flow to which the current packet is associated (1304). If yes, device 130 copies the packet (1308) and broadcasts the packet (1314) to other cooperating network devices. If the packet is not associated with a "newly created" external host (see 1304, above), device 130 next determines if a seen elsewhere flag associated with the host has been marked (1306). If no, device 130 performs other processing on the packet. If a seen elsewhere flag has been marked for the host (1306), then device 130 copies the packet (1309) and determines if a mirroring device identifier associated with the host is set to "all" (1310). If no, device 130 transmits (unicasts) the copied packet (1312) to the cooperating network device identified in the mirroring device identifier. Otherwise, device 130 broadcasts the copied packet to the other cooperating network devices.

The above-described embodiments advantageously provide various methods, systems and apparatuses for detecting and tracking asymmetric data flows. As a result, effective classification and rate control policies can be maintained.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. In a network device operative to classify data flows and mirror data flows to cooperating network devices, a method facilitating classification of asymmetric data flows, the method comprising:
  detecting, at the network device, one or more packets of a data flow originally received at the network device;
  receiving, at the network device, one or more mirrored packets of the data flow from one or more cooperating network devices;
  classifying the data flow into a network application of a plurality of network applications, at the network device, by applying one or more classification operations to at least one of the one or more originally received packets and at least one of the one or more mirrored packets of the data flow;
  mirroring one or more packets of the data flow to the one or more cooperating network devices by transmitting the one or more packets from the network device to the one or more cooperating network devices; and
  discontinuing the mirroring of packets of the data flow, at the network device, upon termination of the one or more classification operations;
  wherein the detected packets originally received at the network device, the received mirrored packets from the cooperating network devices received at the network device, and the transmitted mirrored packets to the cooperating device network devices from the network device each correspond to the same data flow.

2. The method as recited in claim 1 further comprising determining whether an external host associated with the data flow has been newly identified within a threshold period of time; and wherein execution of the mirroring is conditioned on whether the external host is newly identified.

3. The method as recited in claim 2 further comprising identifying internal and external hosts of the detected data flow; and
adding the internal and external hosts to a host database; and wherein the determining step comprises:

determining whether the external host associated with the data flow has been added to the host database within a threshold hold period of time.

4. The method as recited in claim 2 further comprising:
determining if the data flow is indicator traffic, wherein indicator traffic comprises one or more attributes of a data flow that facilitates classification of other data flows; and
mirroring the indicator traffic to the second network device.

5. In a first network device operative to classify data flows and mirror data flows to a second network device, a method facilitating classification of asymmetric data flows, the method comprising:
receiving, from the second network device, a mirrored packet identifying an external host;
marking a seen elsewhere flag associated with the external host identified in the mirrored packet;
receiving a second original data flow, wherein the second original data flow includes one or more packets;
determining whether the second original data flow is associated with the external host identified in the mirrored packet; and
mirroring at least one packet of the second original data flow to the second network device by transmitting the one or more packets from the first network device to the second network devices, if the seen elsewhere flag corresponding to the external host is marked;
detecting, at the first network device, one or more packets of the data flow originally received at the network device; and
classifying the data flow into respective network applications of a plurality of network applications, at the first network device, by applying one or more classification operations to at least one of the one or more originally received packets and at least one of the one or more mirrored packets of the data flow;
wherein the mirrored packet transmitted from the first network device to the second network device and the one or more packets of the received second original data flow each correspond to the same data flow.

6. The method as recited in claim 5 further comprising:
determining if the second original data flow is indicator traffic wherein indicator traffic comprises one or more attributes of a data flow that facilitates classification of other data flows; and
mirroring the indicator traffic to the second network device by transmitting packets of the indicator traffic from the network device to the second network device.

7. In a first network device operative to classify data flows and mirror data flows to a second network device, a method facilitating classification of asymmetric data flows, the method comprising:
receiving, at the first network device, one or more packets corresponding to a data flow;
monitoring the data flow for an indication of asymmetry, wherein the indication of asymmetry comprises receiving one or more mirrored packets of the data flow from one or more cooperating network devices or receiving an ACK packet in the data flow wherein the first network device did not encounter a corresponding TCP packet of the ACK packet;
mirroring one or more packets of the data flow to the second network device by transmitting the one or more packets of the data flow from the first network device to the second network device, if an indication of asymmetry is detected; and classifying the data flow into a network application of a plurality of network applications, at the first network device, by applying one or more classification operations to at least one of the one or more originally received packets and at least one of the one or more mirrored packets of the data flow;
wherein the one or more packets received at the first network device and the mirrored one or more packets transmitted from the first network device to the second network device each correspond to the same data flow.

8. The method as recited in claim 7 further comprising:
marking an external host asymmetry flag pertaining to an external host associated with the data flow, if an indication of asymmetry is detected;
receiving a new data flow, associated with the external host, comprising one or more packets; and
mirroring the one or more packets of the new data flow to the second network device until the new data flow is classified, if the external host asymmetry flag is marked.

9. In a network device operative to classify data flows and mirror data flows to one or more cooperating network devices, a method facilitating classification of asymmetric data flows, the method comprising:
detecting, at the network device, a data flow, comprising one or more packets, corresponding to an external host;
mirroring the one or more packets of the data flow to at least a plurality of network devices of the one or more cooperating network devices;
receiving an indication that one or more other packets of the data flow has been detected at a first network device of plurality of network devices;
mirroring, after receipt of the indication, one or more packets of the data flow, and one or more packets of subsequent data flows associated with the external host, by transmitting the one or more packets of the data flow from the network device only to the first network device; and
classifying the data flow and the subsequent data flows into respective network applications of a plurality of network applications, at the network device, by applying one or more classification operations to at least one of the one or more originally received packets and at least one of one or more mirrored packets of the data flow received from the first network device;
wherein the detected one or more packets corresponding to an external at the network device and the mirrored one or more packets to the plurality of cooperating network devices each correspond to the same data flow.

10. The method as recited in claim 9 further comprising mirroring one or more packets of the data flow to the plurality of network devices, if one or more packets of the data flow, or one or more packets of subsequent data flows associated with the external host, is detected at one of the network devices in the plurality of network devices other than the first network device.

11. The method as recited in claim 9 wherein mirroring the one or more packets of the data flow to the first network device or to the one or more other network devices is controlled via a mirroring device identifier.

12. The method as recited in claim 11 wherein the mirroring device identifier is a MAC address.

13. In a network device operative to classify data flows and mirror data flows to one or more cooperating network devices, a method facilitating classification of asymmetric data flows, the method comprising:

receiving a mirror packet corresponding to a data flow associated with an external host transmitted from a first network device of the one or more cooperating network devices;

if the mirroring device identifier is not set, setting a mirroring device identifier associated with the external host to correspond to the first network device;

receiving, at the network device, one or more mirror packets associated with the external host transmitted from at least a second network device of the one or more cooperating network devices;

setting, at the network device, the mirroring device identifier to cause the network device to mirror subsequent packets associated with the external host by transmitting the subsequent packets from the network device to all network devices of the one or more cooperating network devices;

detecting, at the network device, one or more packets of the data flow originally received at the network device; and classifying the data flow into respective network applications of a plurality of network applications, at the network device, by applying one or more classification operations to at least one of the one or more originally received packets and at least one of the one or more mirrored packets of the data flow;

wherein the originally received packets and the mirrored packets each correspond to the same data flow.

14. The method as recited in claim 13 further comprising marking a seen elsewhere flag associated with the external host, after receiving one or more mirror packets from at least one of the one or more cooperating network devices.

15. A network device operative to classify asymmetric data flows and mirror data flows to one or more cooperating network devices, the network device comprising:

one or more network interfaces;

a memory;

one or more processors; and an application, physically stored in the memory, including instructions operable to cause the one or more processors and the network device to:

detect, at the network device, one or more packets of a data flow originally received at the network device;

receive one or more mirrored packets of the data flow from one or more cooperating network devices;

classify the data flow into respective network applications of a plurality of network applications, at the network device, by applying one or more classification operations to at least one of the one or more originally received packets and at least one of the one or more mirrored packets of the data flow;

mirror one or more packets of the data flow to the one or more cooperating network devices by transmitting the one or more packets from the network device to the one or more cooperating network devices; and discontinue mirroring of packets of the data flow upon termination of the one or more classification operations;

wherein the detected packets, received packets, and mirrored packets each correspond to the same data flow.

* * * * *